(12) United States Patent
Kishimoto et al.

(10) Patent No.: US 9,441,155 B2
(45) Date of Patent: Sep. 13, 2016

(54) WAVELENGTH CONVERTING MEMBER, LIGHT-EMITTING DEVICE, ILLUMINATING DEVICE, VEHICLE HEADLIGHT, AND METHOD FOR PRODUCING WAVELENGTH CONVERTING MEMBER

(71) Applicant: SHARP KABUSHIKI KAISHA, Osaka-shi (JP)

(72) Inventors: Katsuhiko Kishimoto, Osaka (JP); Rina Sato, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 503 days.

(21) Appl. No.: 13/910,775

(22) Filed: Jun. 5, 2013

(65) Prior Publication Data

US 2013/0329442 A1 Dec. 12, 2013

(30) Foreign Application Priority Data

Jun. 6, 2012 (JP) ................................ 2012-129348
Jul. 12, 2012 (JP) ................................ 2012-156795

(51) Int. Cl.
| | | |
|---|---|---|
| C09K 11/77 | (2006.01) |
| F21V 9/16 | (2006.01) |
| F21S 8/10 | (2006.01) |
| F21S 8/04 | (2006.01) |
| G02B 6/42 | (2006.01) |
| F21V 8/00 | (2006.01) |
| C03C 14/00 | (2006.01) |
| F21Y 101/02 | (2006.01) |

(52) U.S. Cl.
CPC ......... *C09K 11/7774* (2013.01); *C03C 14/006* (2013.01); *F21S 8/04* (2013.01); *F21S 48/1154* (2013.01); *F21S 48/1225* (2013.01); *F21V 9/16* (2013.01); *G02B 6/0008* (2013.01); *G02B 6/4298* (2013.01); *F21Y 2101/025* (2013.01)

(58) Field of Classification Search
CPC ... H01L 33/502; H01L 33/504; H05B 33/12; Y10S 428/917; F21S 48/1225; F21S 48/1154; F21S 8/04; F21S 48/1145; F21V 9/16; F21V 29/20; F21V 29/004; F21Y 2101/025; F21Y 2101/02; G02B 6/0008; G02B 6/4298; B60Q 1/04; F21K 9/00
See application file for complete search history.

(56) References Cited

U.S. PATENT DOCUMENTS

| | | |
|---|---|---|
| 2004/0129946 A1 | 7/2004 | Nagai et al. |
| 2006/0245201 A1 | 11/2006 | Wada et al. |
| 2007/0259206 A1* | 11/2007 | Oshio .................. C04B 35/581 428/690 |
| 2009/0186433 A1 | 7/2009 | Yamaguchi et al. |

FOREIGN PATENT DOCUMENTS

| | | |
|---|---|---|
| JP | 2004-140185 | 5/2004 |
| JP | 2004-241142 | 8/2004 |
| JP | 2006-310204 | 11/2006 |
| JP | 2008-21868 | 1/2008 |
| JP | 2009-177131 | 8/2009 |

(Continued)

*Primary Examiner* — Stephen F Husar
*Assistant Examiner* — Danielle Allen
(74) *Attorney, Agent, or Firm* — Morrison & Foerster LLP

(57) ABSTRACT

The light-emitting section contains a fluorescent substance which is a YAG:Ce fluorescent substance. An average particle size of the fluorescent substance is 1·m or larger and 50·m or smaller, and a sealing material for sealing the fluorescent substance has a density of 2.0 g/cm³ or higher and 7.0 g/cm³ or lower.

18 Claims, 9 Drawing Sheets

(56) References Cited

FOREIGN PATENT DOCUMENTS

| | | |
|---|---|---|
| JP | 2009-212281 | 9/2009 |
| JP | 2011-204718 | 10/2011 |
| JP | 2012-59454 | 3/2012 |

\* cited by examiner

|  | LED DOWNLIGHT 300 | LASER DOWNLIGHT 200 |
|---|---|---|
| OUTER DIMENSIONS | DIAMETER OF 117×91mm | DIAMETER OF 60×20mm |
| EMBEDDING HOLE SIZE | DIAMETER OF 100mm | DIAMETER OF 50mm |
| EMBEDDED UNIT HEIGHT | 85mm | 15mm |
| MASS | 0.7Kg | 0.1Kg |

WAVELENGTH CONVERTING MEMBER, LIGHT-EMITTING DEVICE, ILLUMINATING DEVICE, VEHICLE HEADLIGHT, AND METHOD FOR PRODUCING WAVELENGTH CONVERTING MEMBER

This Nonprovisional application claims priority under 35 U.S.C. §119 on Patent Applications (i) No. 2012-129348 filed in Japan on Jun. 6, 2012 and (ii) No. 2012-156795 filed in Japan on Jul. 12, 2012, the entire contents of which are hereby incorporated by reference.

TECHNICAL FIELD

The present invention relates to (i) a wavelength converting member for a light-emitting device that functions as a high-luminance light source, (ii) an illuminating device including the light-emitting device, and (iii) a vehicle headlight including the light-emitting device.

BACKGROUND ART

Recent years have witnessed more and more research conducted on a light-emitting device that (i) includes, as an excitation light source, a semiconductor light emitting element such as a light emitting diode (LED) and a laser diode (LD) and that (ii) emits, as illuminating light, fluorescence generated by a wavelength converting member including a fluorescent substance when the wavelength converting member is irradiated with excitation light emitted by the excitation light source. Patent Literatures 1 and 2 each disclose an example technique related to such a wavelength converting member.

The technique of Patent Literature 1 collects ultraviolet light, emitted by a semiconductor light emitting element, with use of a light collecting lens so that the ultraviolet light falls upon a fluorescent substance having the shape of a dot with a diameter of 0.5 mm or less. This arrangement allows for optical design based on light emission from a small region, and thus facilitates optical design of a light source unit.

The technique of Patent Literature 2 produces a wavelength converting member by sintering a mixture including inorganic fluorescent substance powder and glass powder. Patent Literature 2 discloses that glass powder and inorganic fluorescent substance powder are preferably mixed at a mass ratio that falls within a range between 99.99:0.01 and 70:30.

A fluorescent substance composite member has luminous efficiency that varies according to (i) the kind and content of fluorescent substance particles dispersed in glass and (ii) the thickness of the fluorescent substance composite member. Too large an amount of a fluorescent substance causes such problems as (i) making it difficult to sinter the fluorescent substance composite member and thus leading to a large porosity, which in turn makes it difficult for excitation light to fall upon the fluorescent substance efficiently, and (ii) making it likely for the fluorescent substance composite member to have a decreased mechanical strength. Too small an amount of a fluorescent substance makes it difficult to cause the fluorescent substance composite member to emit light sufficiently. In view of this, Patent Literature 2 discloses that oxide glass powder and inorganic fluorescent substance powder are preferably mixed at a ratio within the above range.

Producing a high-luminance light source preferably involves use of a small wavelength converting member as a light-emitting section for such a light source. Using laser light as excitation light makes it possible to excite a fluorescent substance at a high light density, and thus facilitates producing a high-luminance light source.

CITATION LIST

Patent Literature 1

Japanese Patent Application Publication, Tokukai, No. 2004-241142 A (Publication Date: Aug. 26, 2004)

Patent Literature 2

Japanese Patent Application Publication, Tokukai, No. 2008-21868 A (Publication Date: Jan. 31, 2008)

Patent Literature 3

Japanese Patent Application Publication, Tokukai, No. 2009-212281 A (Publication Date: Sep. 17, 2009)

Patent Literature 4

Japanese Patent Application Publication, Tokukai, No. 2006-310204 A (Publication Date: Nov. 9, 2006)

SUMMARY OF INVENTION

Technical Problem

The inventors of the present invention have, however, found the following: Downsizing a wavelength converting member decreases the total amount of a fluorescent substance contained therein. Thus, exciting such a fluorescent substance with use of extremely strong light (high-power light) such as laser light having high light density results in a shortage of the amount of the fluorescent substance with respect to the amount of the excitation light (that is, the fluorescent substance cannot fully absorb the excitation light), thereby making it impossible to produce fluorescence sufficient with respect to the amount of excitation light.

The inventors of the present invention have also found the following: Solving the above problem merely requires containing as large an amount as possible of a fluorescent substance in a wavelength converting member. However, an increase in the amount of a fluorescent substance (in other words, an increase in the density of a fluorescent substance) causes a larger amount of heat to be generated by the fluorescent substance due to excitation. This causes such other problems as (i) making it impossible to produce sufficient fluorescence on the contrary and (ii) affecting properties of the wavelength converting member (for example, chromaticity, color temperature, and life), thus deteriorating the wavelength converting member.

The inventors of the present invention have found that to solve the above problems, it is critical to select a suitable material for a wavelength converting member and use a technique for uniformly dispersing a fluorescent substance in a small wavelength converting member. This is because a local variation in the density of a fluorescent substance, even with a given amount thereof, (i) causes a relatively large amount of heat to be generated in a high-density region, thus making it impossible to produce sufficient fluorescence in such a region, and/or (ii) affects properties of the wavelength converting member (for example, chromaticity, color temperature, and life), thus deteriorating the wavelength converting member. In other words, the more uniformly a fluorescent substance can be dispersed, the larger total amount of the fluorescent substance can be dispersed in a small wavelength converting member.

The description above indicates that the important points in providing a high-luminance light source involving use of laser light are (i) use of a suitable sealing material, (ii) uniform dispersion of a fluorescent substance in the sealing material, and (iii) a small size for the wavelength converting member.

No technique, however, has been developed yet for uniformly dispersing fluorescent substance particles in a small wavelength converting member.

Excitation of a fluorescent substance causes it to generate heat, which may, as described above, deteriorate the wavelength converting member, with the result of decreased luminous efficiency. To solve this problem, Patent Literature 3, for example, discloses a technique for thermally connecting a thermally conductive member to a wavelength converting member in order to prevent the wavelength converting member from being deteriorated by heat generation. The technique of Patent Literature 3 uses the thermally conductive member to receive heat generated in the wavelength converting member, and thus efficiently releases heat of the wavelength converting member.

Repeatedly turning on and off a wavelength converting member by means of irradiation of excitation light, however, decreases the connecting force between the wavelength converting member and the thermally conductive member, and may even disconnect the wavelength converting member and the thermally conductive member from each other. Specifically, since the wavelength converting member has a thermal expansion coefficient different from that of the thermally conductive member, heat generated by the wavelength converting member disconnects the wavelength converting member and the thermally conductive member from each other due to the above difference between the respective thermal expansion coefficients.

In relation to the respective thermal expansion coefficients of a wavelength converting member and a thermally conductive member, Patent Literature 4, for example, discloses a technique by which the thermal expansion coefficient of a sealing material for sealing an LED matches that of a thermally conductive member thermally connected to that sealing material.

However, there still remains the following problem: Typically, a fluorescent substance has a thermal expansion coefficient lower than that of a thermally conductive member. Thus, even if a sealing material has a thermal expansion coefficient matched by that of a thermally conductive member, a wavelength converting member including a fluorescent substance dispersed therein ends up having a thermal expansion coefficient lower than that of the thermally conductive member. This makes it impossible to sufficiently prevent the connecting force between a wavelength converting member and a thermally conductive member from decreasing due to the above difference between the respective thermal expansion coefficients.

In view of the above, the inventors of the present invention turned their attention to the thermal expansion coefficient of a wavelength converting member including a fluorescent substance dispersed therein, and diligently researched on that thermal expansion coefficient. The inventors of the present invention have consequently found that causing the difference between (i) the thermal expansion coefficient of a wavelength converting member including a fluorescent substance dispersed therein and (ii) that of a thermally conductive member to have a certain value or less makes it possible to prevent the connecting force between the wavelength converting member and the thermally conductive member from decreasing due to the difference between the respective thermal expansion coefficients. No such technical concept has been published yet.

The present invention has been accomplished to solve the above problems. It is an object of the present invention to provide (i) a method for producing a wavelength converting member, the method uniformly dispersing fluorescent substance particles in the wavelength converting member and (ii) a wavelength converting member including fluorescent substance particles uniformly dispersed therein.

It is another object of the present invention to provide a light-emitting device that (i) prevents generated heat from deteriorating a wavelength converting member and from decreasing the connecting force between the wavelength converting member and a thermally conductive member and that (ii) is thus capable of emitting light with high efficiency over an extended period of time.

Solution to Problem

In order to attain the object, a wavelength converting member of the present invention includes a YAG:Ce fluorescent substance which is sealed by a sealing material, the YAG:Ce fluorescent substance having an average particle size of 1·m or larger and 50·m or smaller, the sealing material at least partially being made of an amorphous material, and a density of the sealing material being 2.0 g/cm$^3$ or higher and 7.0 g/cm$^3$ or lower.

A method of the present invention for producing a wavelength converting member is a method for producing a wavelength converting member containing a YAG:Ce fluorescent substance, and the method includes the steps of: mixing the YAG:Ce fluorescent substance, which has an average particle size of 1·m or larger and 50·m or smaller, with a sealing material which (i) is at least partially made of an amorphous material and (i) has a density of 2.0 g/cm$^3$ or higher and 7.0 g/cm$^3$ or lower; and sintering a mixture of the YAG:Ce fluorescent substance and the sealing material, which mixture has been prepared in the mixing step.

In order to attain the object, a light-emitting device of the present invention includes: an excitation light source for emitting excitation light; a wavelength converting member containing a fluorescent substance that emits light in response to the excitation light emitted by the excitation light source; and a thermally conductive member that is thermally connected to the wavelength converting member so as to receive heat from the wavelength converting member, a difference between a thermal expansion coefficient of the wavelength converting member containing the fluorescent substance and a thermal expansion coefficient of the thermally conductive member being $0.1 \times 10^{-6}/°$ C. or lower.

Advantageous Effects of Invention

According to the wavelength converting member of the present invention, (i) the YAG:Ce fluorescent substance is sealed by the sealing material, (ii) the YAG:Ce fluorescent substance has an average particle size of 1·m or larger and 50·m or smaller, (iii) the sealing material is at least partially made of an amorphous material, and (iv) a density of the sealing material is 2.0 g/cm$^3$ or higher and 7.0 g/cm$^3$ or lower.

The method of the present invention for producing a wavelength converting member is a method for producing a wavelength converting member containing a YAG:Ce fluorescent substance, and the method includes the steps of: mixing the YAG:Ce fluorescent substance, which has an average particle size of 1·m or larger and 50·m or smaller, with a sealing material which (i) is at least partially made of an amorphous material and (ii) has a density of 2.0 g/cm$^3$ or higher and 7.0 g/cm$^3$ or lower; and sintering a mixture of the YAG:Ce fluorescent substance and the sealing material, which mixture has been prepared in the mixing step.

According to the configuration, it is possible to uniformly disperse the fluorescent substance in the sealing material. Consequently, it is possible to bring about an effect of suppressing a deterioration of the wavelength converting member and of extending the life of the wavelength converting member.

The light-emitting device of the present invention includes: an excitation light source for emitting excitation light; a wavelength converting member containing a fluorescent substance that emits light in response to the excitation light emitted by the excitation light source; and a thermally conductive member that is thermally connected to the wavelength converting member so as to receive heat from the wavelength converting member, a difference between a thermal expansion coefficient of the wavelength converting member containing the fluorescent substance and a thermal expansion coefficient of the thermally conductive member being $0.1 \times 10^{-6}/°$ C. or lower.

This brings about effects of (i) preventing a deterioration of the wavelength converting member due to generated heat, (ii) preventing a decrease in connecting force between the wavelength converting member and the thermally conductive member, and (iii) emitting light with high efficiency for a long time period.

DESCRIPTION OF EMBODIMENTS

Embodiment 1

Figure 1:
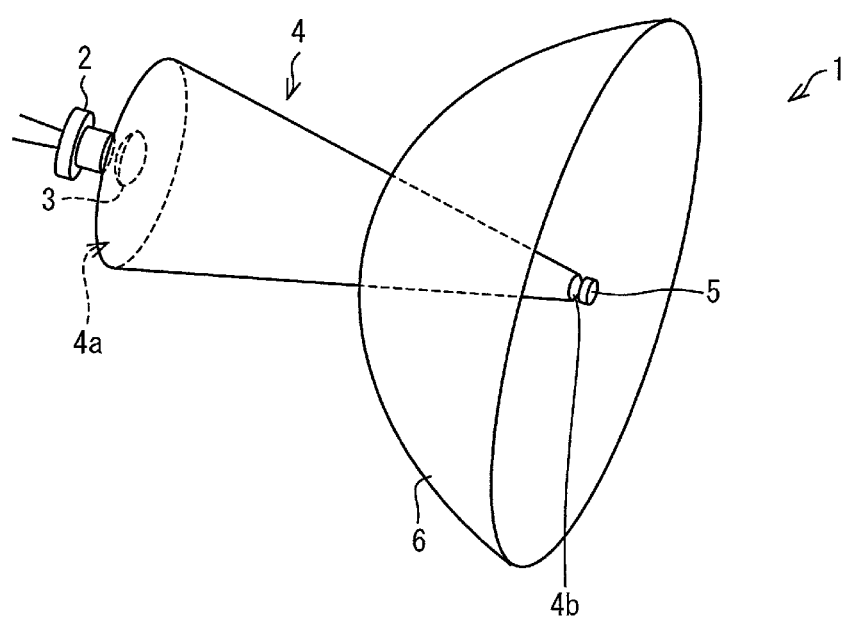
FIG. 1 is a view schematically illustrating a configuration of a headlamp in accordance with an embodiment of the present invention.
Figure 2:
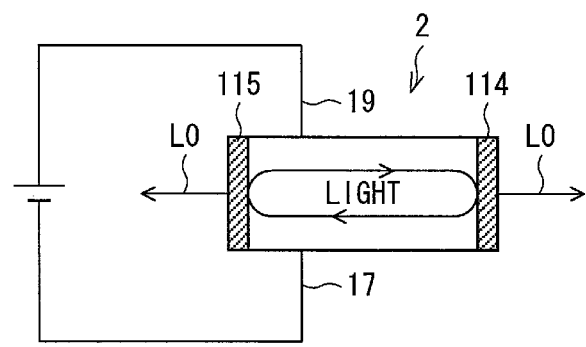
FIG. 2 is a view schematically illustrating a circuit diagram of a laser diode included in the headlamp illustrated in FIG. 1.
Figure 3:
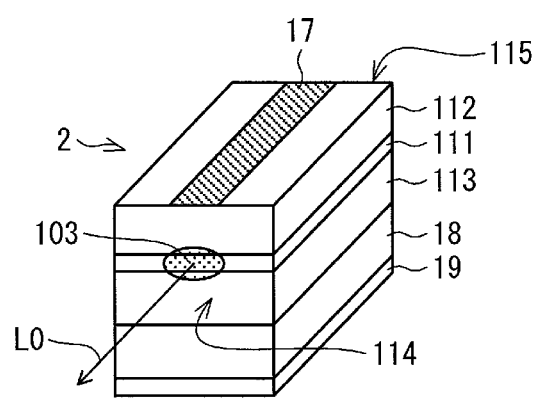
FIG. 3 is a perspective view illustrating a fundamental structure of the laser diode illustrated in FIG. 2.

The following description will discuss an embodiment of the present invention with reference to FIGS. 1 through 3. In Embodiment 1, a headlamp (vehicle headlight) 1 that meets the light distribution property standards for a driving headlamp (i.e., a high beam) for an automobile is described as an example of an illuminating device in accordance with the present invention.

Note, however, that the illuminating device in accordance with the present invention can be achieved also as a headlamp for a vehicle other than the automobile or for a moving object other than the automobile (e.g., a person, a vessel, an airplane, a submersible vessel, or a rocket). The illuminating device of the present invention can further alternatively be used as another type of an illuminating device such as a searchlight, a projector, or a household illumination instrument.

<Configuration of Headlamp 1>

The following description will first discuss a configuration of the headlamp 1 of the present embodiment with reference to FIG. 1. FIG. 1 is a view schematically illustrating a configuration of the headlamp 1 in accordance with the present embodiment. The headlamp 1 includes a laser diode (excitation light source) 2, an aspheric lens 3, a light guide section 4, a light-emitting section (wavelength converting member) 5, and a reflecting mirror 6 (see FIG. 1). The laser diode 2, the light guide section 4, and the light-emitting section 5 constitute a fundamental structure of the light-emitting device.

(Laser Diode 2)

The laser diode 2 serves as an excitation light source for emitting excitation light. The number of the laser diode 2 may be one or a plural number. The laser diode 2 may have one (1) light-emitting point on one (1) chip or have a plurality of light-emitting points on one (1) chip. In the present embodiment, a laser diode 2 is employed which has one (1) light-emitting point on one (1) chip.

The laser diode 2 has one (1) light-emitting point (one stripe) on one (1) chip. For example, the laser diode 2 emits an oscillating laser light at a wavelength of 445 nm (blue), and its optical power is 1.0 W, operating voltage is 4 V, and electric current is 0.7 A. The laser diode 2 is sealed in a package (stem) that is 9 mm in diameter. A wavelength of the oscillating laser light emitted by the laser diode 2 is not limited to 445 nm, provided that the oscillating laser light has a peak wavelength falling within a range between 420 nm and 490 nm.

It is preferable that the optical power of the laser diode 2 is 1 W or higher and 20 W or lower, and a light density of laser light with which the light-emitting section 5 is irradiated is 0.1 W/mm$^2$ or higher and 50 W/mm$^2$ or lower. With the optical power falling within the range, it is possible to prevent the light-emitting section 5 from being extremely deteriorated by excessively high power laser light. That is, it is possible to provide a light source which can achieve a high luminous flux, a high luminance, and a long life.

Note that a laser light source (a solid laser) other than the laser diode may be employed as the excitation light source for emitting laser light. Alternatively, a light emitting diode may be employed as the excitation light source.

(Aspheric Lens 3)

The aspheric lens 3 is a lens for guiding oscillating laser light, which has been emitted by the laser diode 2, so that the laser light enters a light entrance surface 4a which is one of ends of the light guide section 4. The aspheric lens 3 is not limited in its shape and material, provided that the aspheric lens 3 has the function above described. Note, however, that it is preferable that the aspheric lens 3 (i) has a high transmittance in the vicinity of the wavelength of 445 nm, which is a wavelength of oscillating laser light emitted by the laser diode 2, and (ii) is made of a material having high heat resistance.

Note that the aspheric lens 3 is not an essential element, in a case where oscillating laser light emitted by the laser diode 2 can properly enter the light guide section 4 without the aspheric lens 3.

(Light Guide Section 4)

The light guide section 4 is a light guide member having a truncated cone shape. The light guide section 4 collects oscillating laser light emitted from the laser diode 2 and guides the laser light toward the light-emitting section 5 (i.e., toward the laser light illuminated surface of the light-emitting section 5). The light guide section 4 is optically connected to the laser diode 2 via the aspheric lens 3. The light guide section 4 has (i) a light entrance surface 4a (entrance end section) for receiving laser light emitted by the laser diode 2 and (ii) a light emission surface 4b (emission end section) for emitting the laser light, which has been received via the light entrance surface 4a, toward the light-emitting section 5.

The light emission surface 4b has an area which is smaller than that of the light entrance surface 4a. With the configuration, laser light which has entered the light entrance surface 4a is reflected by a side surface of the light guide section 4 while traveling forward so that the laser light is converged and then emitted from the light emission surface 4b.

The light guide section 4 is made from quartz glass, acrylic resin, or any other transparent material. Shapes of the light entrance surface 4a and the light emission surface 4b can be planar or curved shapes.

A coupling efficiency of the aspheric lens 3 and the light guide section 4 is 90% (i.e., a ratio of an intensity of laser light emitted from the light emission surface 4b of the light guide section 4 with respect to an intensity of laser light emitted by the laser diode 2 is 90%). This means that, in a case where the laser diode 2 emits laser light with an intensity of 1 W, the intensity of the laser light, which is emitted from the light emission surface 4b after travelling through the aspheric lens 3 and the light guide section 4, is 0.9 W.

Note that the light guide section 4 is not limited to the member having the truncated cone shape but can be an optical fiber as later described, provided that the light guide section 4 can guide laser light, which has been emitted by the laser diode 2, to the light-emitting section 5. Alternatively, the light emitted by the laser diode 2 may travel toward the light-emitting section 5 directly or via the aspheric lens 3, without providing the light guide section 4. Such a configuration can be employed in a case where a distance between the laser diode 2 and the light-emitting section 5 is short.

(Light-Emitting Section 5)

The light emitting section 5 emits light upon receipt of laser light emitted from the light emission surface 4b of the light guide section 4. In the light emitting section 5, a fluorescent substance that emits light upon receipt of laser light is dispersed in a glass material (e.g., inorganic low-melting glass) serving as a sealing material. A composition of the light-emitting section 5 and a method for producing the light-emitting section 5 will be described later.

The light-emitting section 5 is fixed at or in the vicinity of a focal point of the reflecting mirror 6 by a bar-shaped member or a tubular member that extends from the reflecting mirror 6. The method for fixing the light-emitting section 5 is not limited to this, provided that the light-emitting section 5 is fixed in a manner with which functions of the reflecting mirror 6 and the light-emitting section 5 are hardly inhibited.

The light-emitting section 5 is not limited in shape, and can have a rectangular parallelepiped shape or a cylindrical shape. In the present embodiment, the light-emitting section 5 has a columnar shape with a diameter of 2 mm and a thickness of 1 mm.

The thickness of the light-emitting section 5 is not limited to 1 mm, provided that laser light is partially converted into yellow fluorescence by the light-emitting section 5 and the yellow fluorescence is mixed with blue laser light, which has not been converted, so that the yellow fluorescence and the blue laser light thus mixed are emitted as white illuminating light.

A required thickness of the light-emitting section 5 varies in accordance with a ratio between the sealing material and the fluorescent substance in the light-emitting section 5. As an amount of the fluorescent substance contained in the light-emitting section 5 increases, a conversion efficiency, with which the laser light is converted into the yellow fluorescence, becomes higher. This makes it possible to reduce a thickness of the light-emitting section 5.

(Reflecting Mirror 6)

The reflecting mirror 6 reflects illuminating light (hereinafter, referred to merely as "light") emitted from the light-emitting section 5, thereby forming a bundle of rays that travels in a predetermined solid angle. In other words, the reflecting mirror 6 reflects light from the light-emitting section 5 so as to form a bundle of rays that travels forward from the headlamp 1. The reflecting mirror 6 has an opening in a traveling direction in which reflected light is directed. The reflecting mirror 6 may be, for example, (i) a member which has a curved surface shape (cup-like shape) and is coated with a metal thin film or (ii) a metal member having a curved surface shape.

The reflecting mirror 6 may be a mirror such as (i) a full-parabolic mirror having a circular opening or (ii) a half-parabolic mirror having a semicircular opening. Alternatively, it is possible to employ, other than the parabolic mirror, an ellipse-shaped mirror, a free-form surface mirror, or a multi-facet mirror (multireflector). Furthermore, the reflecting mirror 6 may partially include a part that is not a curved surface.

(Composition of Light-Emitting Section 5)

The inventors of the present invention found that the light-emitting section is remarkably deteriorated in a case where the light-emitting section is excited with a high-powered laser light. The deterioration of the light-emitting section is mainly caused by a deterioration of the fluorescent substance itself included in the light-emitting section, and further by a deterioration of the sealing material that surrounds the fluorescent substance. For example, while a YAG:Ce fluorescent substance is being irradiated with excitation light, the YAG:Ce fluorescent substance emits light at an efficiency of 90%, and the rest of the excitation light generates heat. It is believed that the heat deteriorates the sealing material.

Under the circumstances, it is highly important to appropriately select materials of the sealing material and the fluorescent substance, in order to extend the life of the light-emitting section. In view of this, the present invention employs the light-emitting section 5 that at least partially contains, as the sealing material, an amorphous material, i.e., a low-melting glass material in which the YAG:Ce fluorescent substance is dispersed. In a case where at least part of the sealing material is an amorphous material, it is possible (i) to rapidly release heat, which is generated when the fluorescent substance is excited, from the wavelength converting member to the outside and (ii) to prevent the sealing material from being notably deteriorated.

(Composition of Sealing Material)

It is possible to employ, as the sealing material, a material that at least partially contains an amorphous material such as inorganic glass or aluminum oxide. In particular, it is preferable to employ low-melting glass as the sealing material. It is preferable that the low-melting glass has a glass transition point of 600° C. or lower and contains at least one of $SiO_2$, $B_2O_3$, and ZnO. By adding $SiO_2$, $B_2O_3$, or ZnO, it is possible (i) to lower a glass transition point and a sintering temperature while stabilizing the low-melting glass and (ii) to keep transparency of the low-melting glass.

Examples of a composition of the glass material encompass $SiO_2$—$B_2O_3$—CaO—BaO—$Li_2O$—$Na_2O$.

In a case where the low-melting glass material is employed as the sealing material, an effect as below can be brought about: that is, even when the fluorescent substance is irradiated with laser light and accordingly the fluorescent substance generates heat, the light-emitting section 5 is not deteriorated because of high heat resistance of glass. It is further possible to prevent a change in color of the sealing material, which change in color is caused in a case where (i) silicone resin is employed as the sealing material and (ii) the silicone resin is deteriorated because the silicone resin is irradiated with light for long time.

(Composition of Fluorescent Substance)

The fluorescent substance contained in the light-emitting section 5 is a YAG:Ce fluorescent substance and is dispersed in the low-melting glass.

The laser diode 2 emits oscillating laser light at a wavelength of 445 nm (blue). When the light-emitting section 5 is irradiated with the laser light, blue light of the excitation light and yellow fluorescence are mixed, so that white light is generated. From this, the light-emitting section 5 can be considered as a wavelength converting member.

(Density of Fluorescent Substance and Sealing Material)

It is preferable that the YAG:Ce fluorescent substance contained in the light-emitting section 5 has an average particle size of 1·m or larger and 50·m or smaller. In this case, a density of the sealing material is 2.0 g/cm$^3$ or higher and 7.0 g/cm$^3$ or lower, more preferably 2.0 g/cm$^3$ or higher and 6.0 g/cm$^3$ or lower.

In a case where dispersion of the fluorescent substance in the light-emitting section 5 is biased, it is likely that the light-emitting section 5 is deteriorated due to heat generated in a part in which the fluorescent substance densely exists. However, the inventors of the present invention have diligently studied and found that the fluorescent substance can be dispersed uniformly in the sealing material by employing (i) the above described range of average particle size of the fluorescent substance and (ii) the above described density of the sealing material.

The density of the YAG:Ce fluorescent substance is approximately 4.8 g/cm$^3$. In a case where a YAG:Ce fluorescent substance having an average particle size of 1·m or larger and 50·m or smaller is combined with a sealing material with a density of 2.0 g/cm$^3$ or higher and 7.0 g/cm$^3$ or lower, more preferably with 2.0 g/cm$^3$ or higher and 6.0 g/cm$^3$ or lower, it is possible to uniformly disperse the fluorescent substance.

That is, in a case where the YAG:Ce fluorescent substance is employed and the density of the sealing material falls within the above described range, it is possible to uniformly mix the fluorescent substance with the sealing material. An example experiment for verifying this fact will be described later.

(Particle Sizes of Fluorescent Substance and Sealing Material)

In a case where fluorescent substance powder and sealing material powder, which at least partially contains an amorphous material, are mixed and then sintered so as to form a light-emitting section 5, it is preferable to select average particle sizes of the fluorescent substance powder and the sealing material powder, which average particle sizes fall within a range as described below, in order to easily mix the fluorescent substance powder and the sealing material powder uniformly.

Specifically, in a case where (i) YAG:Ce fluorescent substance powder having an average particle size of 1·m to 50·m is employed and (ii) a particle size of the sealing material powder is smaller than the particle size (i.e., 1·m to 50·m) of the fluorescent substance, bubbles are more likely to remain after the sintering. Such bubbles adversely affect characteristics of the wavelength converting member, e.g., the bubbles causes the wavelength converting member to be cracked while the wavelength converting member is being used. In view of this, it is preferable that the particle size of the sealing material powder is larger than that of the fluorescent substance. Accordingly, it is preferable that the sealing material powder has an average particle size of 1·m or larger and 500·m or smaller.

Meanwhile, in a case where luminous efficiency of the fluorescent substance is considered, it is more preferable that the average particle size of the YAG:Ce fluorescent substance powder falls within a range between 10·m and 40·m. In a case where the average particle size of the sealing material powder is too large, dispersibility of the fluorescent substance is sometimes decreased. Under the circumstances, it is more preferable that the particle size of the sealing material powder falls within a range between 10·m and 350·m, in order both (i) for the wavelength converting member to maintain high luminous efficiency and (ii) for the sealing material and the fluorescent substance to be dispersed uniformly.

In a case where (i) a difference between the average particle sizes of respective of the fluorescent substance powder and the sealing material powder thus falls within a predetermined range and (ii) the densities of respective of the fluorescent substance and the sealing material are set as above described, it is possible to mix the fluorescent substance and the sealing material more uniformly.

If a large and special mixer is used, it is not impossible to uniformly mix the fluorescent substance and the sealing material, even in a case where the densities and the average particle sizes of the fluorescent substance and the sealing material do not meet the above described conditions. However, the present invention can provide (i) a method for easily mixing the fluorescent substance and the sealing material uniformly without using such a special mixer or a special mixing method and (ii) a wavelength converting member produced by such a method of the present invention.

(Mixing Ratio of Fluorescent Substance and Sealing Material)

It is preferable that a mixing ratio of the fluorescent substance powder and the sealing material powder falls within a range between 30:70 and 50:50, in terms of mass ratio.

In general, in a case where (i) a wavelength converting member contains a fluorescent substance which is sealed by a transparent material such as silicone resin or glass and (ii) a concentration of the fluorescent substance in the transparent material is too low, it becomes difficult for the wavelength converting member to emit light. Meanwhile, in a case where the concentration of the fluorescent substance is too high, it becomes difficult for the fluorescent substance to be irradiated with excitation light. In a case where the fluorescent substance powder and the sealing material powder are mixed at a mass ratio of 30:70 to 50:50, it is possible to cause the fluorescent substance to sufficiently emit light.

(Structure of Laser Diode 2)

The following description will discuss a fundamental structure of the laser diode 2. FIG. 2 is a view schematically illustrating a circuit diagram of the laser diode 2. FIG. 3 is a perspective view illustrating a fundamental structure of the laser diode 2 illustrated in FIG. 2. The laser diode 2 includes a cathode electrode 19, a substrate 18, a clad layer 113, an active layer 111, a clad layer 112, and an anode electrode 17 which are stacked in this order (see FIGS. 2 and 3).

The substrate 18 is a semiconductor substrate, and it is preferable that the substrate 18 is made of GaN, sapphire, or SiC so as to obtain blue excitation light for exciting the fluorescent substance as in the present invention. Alternatively, in general, a substrate for laser diode can be made of (i) an IV semiconductor such as Si, Ge, or SiC, (ii) a III-V compound semiconductor such as GaAs, GaP, InP, AlAs, GaN, InN, InSb, GaSb, or AlN, (iii) a II-VI compound semiconductor such as ZnTe, ZeSe, ZnS, or ZnO, (iv) an oxide insulator such as ZnO, $Al_2O_3$, $SiO_2$, $TiO_2$, $CrO_2$, or $CeO_2$, or (v) a nitride insulator such as SiN.

The anode electrode 17 is provided for causing an electric current to be applied to the active layer 111 via the clad layer 112.

The cathode electrode 19 is provided for causing the electric current to be applied to the active layer 111 from below the substrate 18 via the clad layer 113. Note that the electric current is applied while a forward bias voltage is being applied to the anode electrode 17 and the cathode electrode 19.

The active layer 111 is provided between the clad layer 113 and the clad layer 112.

A mixed crystal semiconductor which is made of AlInGaN is employed as each of the active layer 111 and the clad layer 113 so as to obtain blue excitation light. In general, a mixed crystal semiconductor which is mainly composed of Al, Ga, In, As, P, N, or Sb is employed as each of an active layer and a clad layer of a laser diode. Each of the active layer 111 and the clad layer 113 can be made up of such a mixed crystal semiconductor. Alternatively, each of the active layer 111 and the clad layer 113 can be made up of a II-VI compound semiconductor such as Zn, Mg, S, Se, Te, or ZnO.

In the active layer 111, light is emitted in response to applied electric current, and the light thus emitted is confined in the active layer 111 due to a difference in refractive index between the clad layer 112 and the clad layer 113.

Further, the active layer 111 has a front cleaved surface 114 and a rear cleaved surface 115 which face each other so as to confine light amplified by stimulated emission. Each of the front cleaved surface 114 and the rear cleaved surface 115 serves as a mirror.

Note that, unlike a normal mirror which completely reflects light, the light amplified by the stimulated emission is partially emitted, as excitation light L0, from the front cleaved surface 114 and the rear cleaved surface 115 (for convenience, the light is assumed to be partially emitted from the front cleaved surface 114 in this embodiment). Note also that the active layer 111 can have a multilayer quantum well structure.

Note that a reflection film (not illustrated) for laser oscillation is provided on the rear cleaved surface 115, which faces the front cleaved surface 114. The front cleaved surface 114 and the rear cleaved surface 115 have respective different reflectances so that most of the excitation light L0 is emitted from a low-reflectance edge surface (e.g., the front cleaved surface 114) via a light emitting point 103.

The clad layer 113 and the clad layer 112 may be made up of a semiconductor of any one of (i) III-V compound semiconductors such as GaAs, GaP, InP, AlAs, GaN, InN, InSb, GaSb, and AlN and (ii) II-VI compound semiconductors such as ZnTe, ZeSe, ZnS, and ZnO, each of which is of an n-type or a p-type. By applying a forward bias voltage to the anode electrode 17 and the cathode electrode 19, an electric current is supplied to the active layer 111.

The semiconductor layers such as the clad layer 113, the clad layer 112, and the active layer 111 can be deposited by a general deposition method such as an MOCVD (metalorganic chemical vapor deposition), an MBE (molecular beam epitaxy), a CVD (chemical vapor deposition), a laser ablation, or a sputtering. The metal layers can be deposited by a general deposition method such as a vacuum deposition, a plating, a laser ablation, or a sputtering.

(Light Emitting Principle of Light-Emitting Section 5)

Next, the following description will discuss a principle of how a fluorescent substance emits light upon irradiation of oscillating laser light emitted by the laser diode 2.

First, the fluorescent substance contained in the light-emitting section 5 is irradiated with the oscillating laser light emitted from the laser diode 2. Upon irradiation of the laser light, electrons in the fluorescent substance are excited, i.e., are caused to have a high energy state (excitation state) from a low energy state.

After that, because the excitation state is unstable, the energy state of the electrons in the fluorescent substance returns to the low energy state (i.e., an energy state of a ground level, or an energy state of an intermediate metastable level between ground and excited levels) after a certain period of time.

In a case where the electrons excited to be in the high energy state thus returns to the low energy state, the fluorescent material emits light.

Note here that white light can be made by mixing two colors which are complementary colors for each other. On the basis of this principle, the white light can be obtained by combining, as above described, (i) a color of oscillating laser light emitted by the laser diode and (ii) a color of light emitted by the fluorescent substance.

EXAMPLES

The following description will discuss a concrete example of how to produce the light-emitting section 5 by mixing a fluorescent substance and a sealing material.

As the fluorescent substance powder, a YAG:Ce fluorescent substance having an average particle size of 13·μm was employed. A density of the YAG:Ce fluorescent substance was set to approximately 4.8 g/cm³ as early described.

Low-melting glass powder ($SiO_2$—$B_2O_3$—$CaO$—$BaO$—$Li_2O$—$Na_2O$), which was an amorphous material, was employed as powder for forming the sealing material. The low-melting glass powder (i) had a glass transition point of 580° C., (ii) had a softening point of 650° C., (iii) contained boric acid as a composition of amorphous material, (iv) had a density of 3.2 g/cm³, and (iv) had an average particle size of 200·μm.

The sealing material powder and the fluorescent substance powder were weighed so that a mass ratio of (sealing material powder):(YAG:Ce fluorescent substance powder) became 7:3. Further, the powders were mixed uniformly (mixing step). The mixing was carried out by putting the sealing material powder and the fluorescent substance powder, which have been weighed, into a container, and then shaking the sealing material powder and the fluorescent substance powder in the container.

In a case where substances having respective smaller and larger specific gravities are mixed, it can be difficult to uniformly mix such substances because the substances are separated in a vertical direction. Moreover, in a case where substances having respective smaller and larger particle sizes are mixed, it can be difficult to uniformly mix such substances because the substances are separated in the vertical direction.

Under the circumstances, it is preferable that the average particle size of the sealing material powder is 1·μm or larger and 500·μm or smaller. It is further preferable that the average particle size falls within a range between 10·μm and 350·μm. It is preferable that the density of the sealing material powder falls within a range between 2.0 g/cm³ and 7.0 g/cm³. It is further preferable that the density falls within a range between 2.0 g/cm³ and 6.0 g/cm³. By taking into consideration the above conditions, the sealing material powder having an average particle size of 200·μm and a density of 3.2 g/cm³ was employed in the present Example.

Lastly, the resultant mixed powder was put in a metal mold and sintered for 0.5 hour at 560° C. (sintering step), so that a wavelength converting member (light-emitting section 5) was prepared.

By thus uniformly mixing the sealing material powder and the fluorescent substance powder in advance of the sintering step, it is possible to prepare a wavelength converting member in which the fluorescent substance is uniformly dispersed in the sealing material after the sintering step.

Moreover, no organic binder is used in sintering the sealing material powder and the fluorescent substance powder. This makes it possible to prevent a decrease in quality of the wavelength converting member, which decrease in quality can be caused due to insufficient removal of the organic binder.

It is further preferable to determine the average particle size of the sealing material powder, which is to be mixed with the fluorescent substance powder, by taking into consideration the following points:

That is, it is preferable to determine the average particle size of the sealing material powder by taking into consideration (i) a correlation between the average particle size of the sealing material powder and a total light transmittance of a sintered body obtained by sintering the sealing material powder and (ii) a correlation between the average particle size of the sealing material powder and a degree of light scattered inside the sintered body obtained by sintering the sealing material powder. It was found that, basically, (i) as the average particle size of the sealing material powder becomes smaller, (a) the total light transmittance of the sintered body of the sealing material powder becomes lower and (b) the degree of light scattered inside the sintered body becomes higher, whereas, (ii) as the average particle size of the sealing material powder becomes larger, (a) the total light transmittance of the sintered body of the sealing material powder becomes higher and (b) the degree of light scattered inside the sintered body becomes lower.

In a case where (i) the wavelength converting member is employed in which the fluorescent substance is sealed in the sealing material and (ii) the sealing material scatters excitation light to some extent, luminous efficiency of the wavelength converting member becomes higher because the fluorescent substance in the wavelength converting member is easily irradiated with the excitation light evenly. Under the circumstances, in a case where the average particle size of the sealing material powder is appropriately determined in the present embodiment, it is possible to cause the excitation light, which is emitted toward the wavelength converting member, to be properly scattered in the wavelength converting member. This allows an increase in luminous efficiency of the wavelength converting member.

Moreover, in a case where the average particle size of the sealing material powder is appropriately determined in accordance with the average particle size of the fluorescent substance, it is possible to uniformly mix the fluorescent substance and the sealing material. This allows an increase in efficiency of utilization of the excitation light. As a result, it is possible to provide the wavelength converting member which (i) hardly causes a local deterioration of the wavelength converting member and (ii) has high and long-term reliability.

<Effect of Headlamp 1>

As early described, according to the light-emitting section 5 of the headlamp 1, the density of the YAG:Ce fluorescent substance is 4.8 g/cm³, and the density of the sealing material is 2.0 g/cm³ or higher and 7.0 g/cm³ or lower, more preferably 2.0 g/cm³ or higher and 6.0 g/cm³ or lower. This makes it possible to uniformly disperse the fluorescent substance in the low-melting glass, which is the sealing material, and it is therefore possible to enhance the efficiency of utilization of the excitation light.

Moreover, since the fluorescent substance is uniformly dispersed in the low-melting glass, a local deterioration of the light-emitting section 5 is less likely to occur, and it is therefore possible to provide the light-emitting section 5 that has high and long-term reliability.

Embodiment 2

Figure 4:
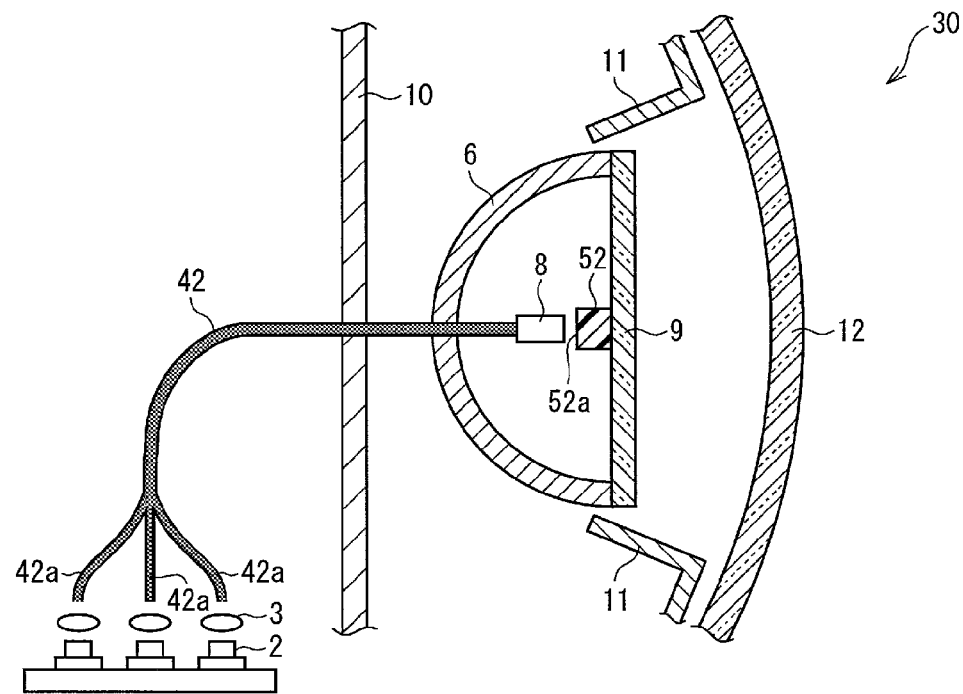
FIG. 4 is a view schematically illustrating a configuration of a headlamp in accordance with another embodiment of the present invention.

The following description will discuss another embodiment of the present invention, with reference to FIG. 4. Note that the same reference numerals are given to members which are similar to those of Embodiment 1, and descriptions of such members are omitted here.

<Configuration of Headlamp 30>

FIG. 4 is a view schematically illustrating a configuration of a headlamp 30 in accordance with the present embodiment. Unlike the headlamp 1, the headlamp 30 includes 20 laser diodes 2, 20 aspheric lenses 3, a light guide section 42, a light-emitting section 52, and an optical fiber fixture (ferrule) 8 (see FIG. 4). The headlamp 30 further includes a transparent plate 9, a housing 10, an extension 11, and a lens 12.

(Laser Diode 2)

According to the present embodiment, 20 laser diodes 2, each of which has one (1) light-emitting point on one (1) chip and has optical power of 1 W, are provided on a substrate so as to constitute a laser diode array. With the configuration, light, whose total radiant flux is 20 W, is emitted by the plurality of laser diodes 2.

Note that it is not essential to use a plurality of laser diodes 2 but the number of the laser diode 2 may be only one. However, in a case where the plurality of laser diodes 2 are employed, high power laser light can be easily obtained.

(Aspheric Lens 3)

Each of the aspheric lenses 3 is a lens for guiding oscillating laser light, which has been emitted by a laser diode 2, so that the laser light enters an entrance end section which is one of ends of an optical fiber 42a. In a case of the present embodiment, for example, FLKN1 405 manufactured by ALPS ELECTRIC CO., LTD. may be used as the aspherical lens 3.

(Light Guide Section 42)

The light guide section 42 is made up of a bundle of 20 optical fibers 42a and serves as a light guide member for guiding oscillating laser lights, which have been emitted by the respective 20 laser diodes 2, toward the light-emitting section 52 through the respective optical fibers 42a. Note that the numbers of the laser diodes 2, the aspheric lenses 3, and the optical fibers 42a are not limited to 20, provided that the same number of the laser diodes 2, the aspheric lenses 3, and the optical fibers 42a are provided.

Each of the optical fibers 42a has (i) an entrance end section for receiving laser light and (ii) an emission end section for emitting laser light which has entered the optical fiber 42a through the entrance end section (that is, the emission end section is the other end of the optical fiber 42a). The emission end sections of the respective optical fibers 42a are bundled by the optical fiber fixture 8 so that a light beam having a diameter of 5 mm is emitted toward a laser light illuminated surface (excitation light illuminated surface) 52a of the light-emitting section 52, which laser light illuminated surface is to be irradiated with laser light. In this case, a light density is approximately 1.0 W/mm². The emission end sections of the respective optical fibers 42a are aligned with respect to the light-emitting section 52 so that the light-emitting section 52 is irradiated with laser lights emitted from the emission end sections.

Specifically, the plurality of emission end sections are aligned so that laser lights are emitted to respective different regions in the laser light illuminated surface 52a. For example, the emission end sections of the respective plurality of optical fibers 42a are arranged in a plane that lies in parallel with the laser light illuminated surface 52a.

By thus arranging the optical fibers 42a, parts of the laser lights emitted from the respective optical fibers 42a, each of which parts has a highest intensity in light intensity distribution of the laser light, are to be emitted to respective different regions of the laser light illuminated surface 52a. In other words, the laser light illuminated surface 52a is to have separate irradiated regions which (i) are formed by the respective laser lights and (ii) have central parts each of which has a maximum light intensity. With the arrangement, the laser lights emitted to the laser light illuminated surface 52a can be dispersed on a two-dimensional plane. This allows the light-emitting section 52 to be locally irradiated with laser lights, and it is therefore possible to prevent the light-emitting section 52 from being partially deteriorated notably.

The optical fiber 42a has a double-layered structure, which consists of (i) a center core and (ii) a clad which surrounds the core and has a refractive index lower than that of the core. The core is made mainly of quartz glass (silicon oxide), which absorbs little laser light and thus prevents a loss of the laser light. The clad is made mainly of (a) quartz glass having a refractive index lower than that of the core or (b) a synthetic resin material.

For example, the optical fiber 42a is made of quartz, and has a core of 200·m in diameter, a clad of 240·m in diameter, and a numerical aperture (NA) of 0.22. Note however that a structure, diameter, and material of the optical fiber 42a are not limited to those described above. The optical fiber 42a can have a rectangular cross-sectioned surface, which is perpendicular to a longitudinal direction of the optical fiber 42a.

Moreover, the optical fiber 42a is flexible, and therefore alignments of the emission end sections with respect to the laser light illuminated surface 52a can be easily changed. This enables positioning the emission end sections to be in accordance with the shape of the laser light illuminated surface 52a of the light-emitting section 52, and it is therefore possible to irradiate the entire laser light illuminated surface 52a of the light-emitting section 52 with laser light.

Further, since the optical fiber 42a is flexible, it is possible to easily change a relative positional relation between the laser diode 2 and the light-emitting section 52. Further, by adjusting a length of the optical fiber 42a, it is possible to locate the laser diode 2 to be away from the light-emitting section 52.

This makes it possible to improve flexibility in design of the headlamp 30. That is, for example, it is possible to provide the laser diodes 2 so that they can be easily cooled and/or replaced. That is, since (i) the positional relation between the entrance end section and the emission end section of the optical fiber 42a can be easily changed and (ii) a relative positional relation between the laser diode 2 and the light-emitting section 52 can be easily changed, it is possible to improve flexibility in design of the headlamp 30.

Note that the light guide member can be a member other than the optical fiber 42a or can be a combination of the optical fiber 42a and another member.

(Optical Fiber Fixture 8)

The optical fiber fixture (ferrule) 8 supports the emission end sections of the plurality of optical fibers 42a in a predetermined pattern with respect to the laser light illuminated surface 52a of the light-emitting section 52. The optical fiber fixture 8 can have holes in a predetermined pattern in which holes the emission end sections of the plurality of optical fibers 42a are inserted. The optical fiber fixture 8 can alternatively be arranged such that (i) it includes an upper portion and a lower portion which are separable from each other and each of which has grooves formed on its connecting surface and (ii) the upper portion and the lower portion sandwich the emission end sections of the respective optical fibers 42a so that the emission end sections are supported in respective holes formed by the grooves.

The optical fiber fixture 8 can be fixed to the reflecting mirror 6 by a bar-shaped member or a tubular member that extends from the reflecting mirror 6. The optical fiber fixture 8 is not particularly limited in material, and is made of, for example, stainless steel. Alternatively, a plurality of optical fiber fixtures 8 may be provided for one (1) light-emitting section 52 such that a plurality of laser lights are emitted toward the one (1) light-emitting section 52.

In a case where the number of the emission end section of the optical fiber 42a is one, it is possible to omit the optical fiber fixture 8. Note, however, that, even in such a case, it is preferable to provide an optical fiber fixture 8 in order to precisely fix the relative position of the emission end section of the optical fiber 42a with respect to the laser light illuminated surface 52a.

(Light-Emitting Section 52)

The light-emitting section 52 is a cylindrical column, which is 5.2 mm in diameter and 1 mm in height. The light-emitting section 52 contains (i) $SiO_2$—$B_2O_3$ low-melting glass containing PbO (ii) and a YAG:Ce fluorescent substance which is dispersed as the fluorescent substance in the $SiO_2$—$B_2O_3$ low-melting glass.

In the light-emitting section 52, a density of the YAG:Ce fluorescent substance is 4.8 g/cm$^3$, a density of the low-melting glass is 2.0 g/cm$^3$ or higher and 7.0 g/cm$^3$ or lower, more preferably 2.0 g/cm$^3$ or higher and 6.0 g/cm$^3$ or lower.

(Transparent Plate 9)

The transparent plate 9 is a transparent resin plate that covers an opening of the reflecting mirror 6. The transparent plate 9 is made of a material that causes white light, which is emitted from the light-emitting section 52, to pass through. The light-emitting section 52 is connected to a surface of the transparent plate 9 which surface faces the optical fiber fixture 8. In this case, the transparent plate 9 can bring about an effect of releasing heat of the light-emitting section 52 by configuring the transparent plate 9 with a material having thermal conductivity higher than that of the light-emitting section 52.

(Housing 10)

The housing 10 forms a body of the headlamp 30 and contains members such as the reflecting mirror 6. The light guide section 42 penetrates through the housing 10, and the laser diode 2 is disposed outside the housing 10. Although the laser diode 2 generates heat when oscillating laser light is emitted, it is possible to efficiently cool the laser diode 2 by providing the laser diode 2 outside the housing 10. Consequently, it is possible to prevent a deterioration in properties of the light-emitting section 52 or thermal damage, which can be caused due to heat generated from the laser diode 2.

(Extension 11)

The extension 11 is disposed on a lateral part of the reflecting mirror 6 on an opening side. The extension 11 conceals an inner configuration of the headlamp 30 so as to improve design of the headlamp 30, and to further enhance a sense of unity between the reflecting mirror 6 and a vehicle body. The extension 11 (i) may be a member having a reflection curved surface which is coated with a metal thin film or (ii) may be a metal member, as with the reflecting mirror 6.

(Lens 12)

The lens 12 is disposed on the opening of the housing 10, and seals an inner part of the headlamp 30. Light emitted from the light-emitting section 52 and then reflected from the reflecting mirror 6 travels toward the front of the headlamp 30 through the lens 12.

<Effect of Headlamp 30>

As above described, in the light-emitting section 52 of the headlamp 30, the density of the YAG:Ce fluorescent substance is 4.8 g/cm$^3$, the density of the sealing material is 2.0 g/cm$^3$ or higher and 7.0 g/cm$^3$ or lower, more preferably 2.0 g/cm$^3$ or higher and 6.0 g/cm$^3$ or lower. This allows the fluorescent substance to be uniformly dispersed in the low-melting glass which is the sealing material, and it is therefore possible to enhance efficiency of utilization of the excitation light.

Moreover, since the fluorescent substance is uniformly dispersed in the low-melting glass, a local deterioration of the light-emitting section 52 is less likely to occur, and it is therefore possible to provide the light-emitting section 52 that has high and long-term reliability.

Embodiment 3

The following description will discuss another embodiment of the present invention, with reference to FIGS. 5 through 9. Note that the same reference numerals are given to members which are similar to those of Embodiments 1 and 2, and descriptions of such members are omitted here.

<Configuration of Headlamp 60>

Figure 5:
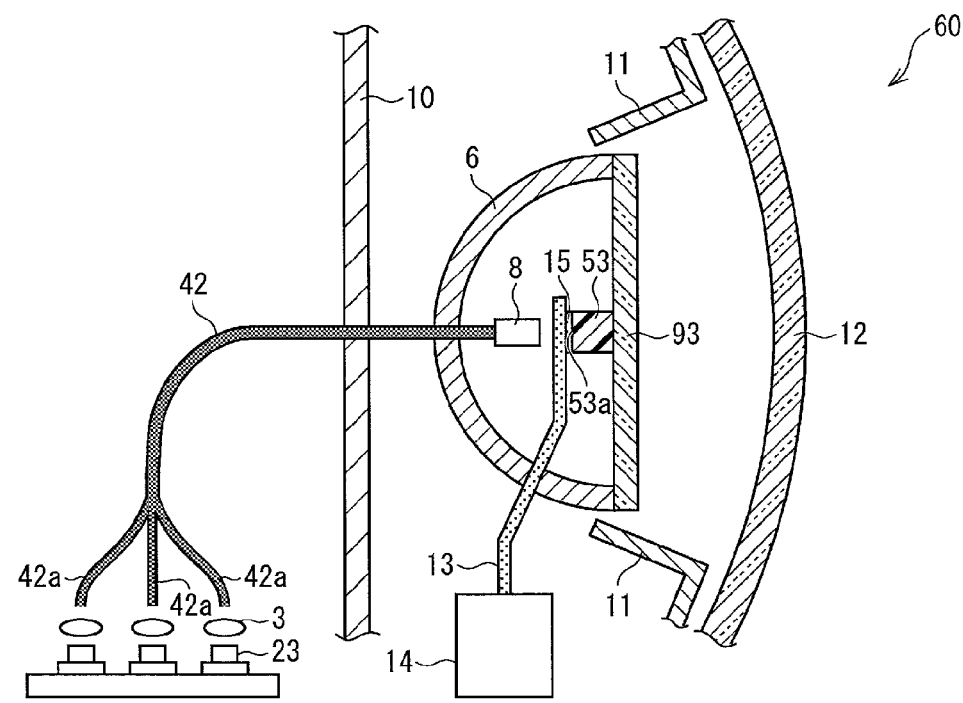
FIG. 5 is a view schematically illustrating a configuration of a headlamp in accordance with yet another embodiment of the present invention.
Figure 6:
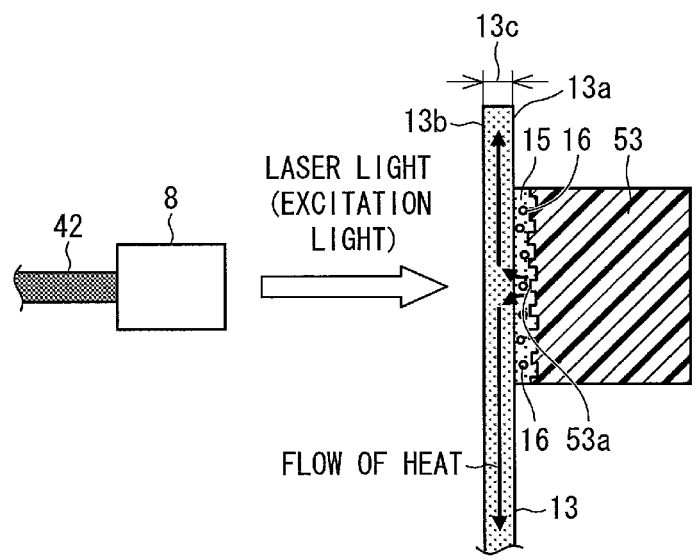
FIG. 6 is a cross-sectional view illustrating how a light-emitting section and a thermally conductive member illustrated in FIG. 5 are thermally connected to each other via a connecting layer.

The description below first deals with an arrangement of a headlamp 60 with reference to FIGS. 5 and 6. FIG. 5 is a cross-sectional view illustrating a configuration of the headlamp 60 of the present embodiment. FIG. 6 is a cross-sectional view illustrating a configuration in which a light-emitting section 53 and a thermally conductive member 13 illustrated in FIG. 5 are thermally connected to each other by means of a connecting layer 15.

The headlamp 60, as illustrated in FIGS. 5 and 6, differs from the headlamp 30 in that it further includes a thermally conductive member 13, a cooling section 14, and a connecting layer 15. Specifically, the headlamp 60 includes laser diodes 23, aspheric lenses 3, a light-guiding section 42, an optical fiber fixture 8, a light-emitting section 53, a reflecting mirror 6, a transparent plate 93, a housing 10, an extension 11, a lens 12, a thermally conductive member 13, a cooling section 14, and a connecting layer 15. The description below deals with the individual members included in the headlamp 60.

(Laser Diodes 23)

The laser diodes 23 each function as an excitation light source for emitting excitation light, and are arranged on a substrate so as to form a laser diode array. The laser diodes 23 each include a single light-emitting point on a single chip. The laser diodes 23 each (i) emit oscillating laser light at a wavelength of, for example, 405 nm (blue violet) and (ii) have an output power of 1.0 W, an operating voltage of 4.0 V, and a current of 0.6 A. The laser diodes 23 are contained in a package having a diameter of 5.6 mm. The oscillating laser light emitted by the laser diodes 23 is not limited to laser light of 405 nm, and may be changed as appropriate according to, for example, the kind of a fluorescent substance included in the light-emitting section 53. The laser diodes 23 each emit laser light having a peak wavelength within a wavelength range of, for example, 380 nm or more and 500 nm or less.

If it is possible to produce a high-quality short wavelength laser diode that can emit oscillating laser light having a wavelength shorter than 380 nm, the laser diodes 23 of the present embodiment can each be a laser diode 23 that is designed to emit oscillating laser light having a wavelength shorter than 380 nm.

(Light-Emitting Section 53)

The light-emitting section 53 emits light in response to laser light emitted by the laser diodes 23, and includes a fluorescent substance that emits light in response to laser light. The light-emitting section 53 includes, for example, (i) an inorganic glass material as a sealing material and (ii) a fluorescent substance dispersed in the inorganic glass material. The inorganic glass material and the fluorescent substance have a ratio of, for example, approximately 10:2. The sealing material is preferably a transparent and heat-resistant material, and is not limited to an inorganic glass material. The sealing material may alternatively be, for example, a so-called organic/inorganic hybrid glass material or resin. The sealing material is, however, preferably a material that also has high thermal conductivity.

The fluorescent substance dispersed in the sealing material is, for example, an oxynitride fluorescent substance or nitride fluorescent substance, and one or more of (i) a fluorescent substance that emits blue light, (ii) a fluorescent substance that emits green light, and (iii) a fluorescent substance that emits red light are dispersed in a glass material. For instance, the light-emitting section 53, upon irradiation with oscillating laser light emitted by the laser diodes 23 and having a wavelength of 405 nm (blue violet), emits white light produced from a mixture of a plurality of colors. The light-emitting section 53 can thus be construed as a wavelength converting material.

The laser diodes 23 may each be a laser diode that emits laser light of 450 nm (blue) or so-called laser light having a wavelength of or near the blue range (that is, laser light having a peak wavelength within a wavelength range of 440 nm or more and 500 nm or less). The fluorescent substance is, in this case, either a yellow fluorescent substance or a mixture of a green fluorescent substance and a red fluorescent substance. A yellow fluorescent substance is a fluorescent substance that emits light having a peak wavelength within a wavelength range of 560 nm or more and 590 nm or less. A green fluorescent substance is a fluorescent substance that emits light having a peak wavelength within a wavelength range of 510 nm or more and 560 nm or less. A red fluorescent substance is a fluorescent substance that emits light having a peak wavelength within a wavelength range of 600 nm or more and 680 nm or less.

The light-emitting section 53 preferably includes an oxynitride fluorescent substance, a nitride fluorescent substance, or a III-V group compound semiconductor nanoparticle fluorescent substance. These materials are highly tolerant of extremely strong laser light (that is, its output power and light density) emitted by the laser diodes 23, and are thus the most suitable for a laser illuminating light source.

A typical oxynitride fluorescent substance is a so-called sialon fluorescent substance. A sialon fluorescent substance is a silicon nitride in which (i) one or more of the silicon atoms have been substituted by an aluminum atom(s) and (ii) one or more of the nitrogen atoms have been substituted by an oxygen atom(s). A sialon fluorescent substance can be produced by solidifying alumina ($Al_2O_3$), silica ($SiO_2$), a rare earth element and/or the like with silicon nitride ($Si_3N_4$).

One feature of the semiconductor nanoparticle fluorescent substance is that even in the case where only a single type of compound semiconductor (for example, indium phosphide: InP) is used, it is possible to change its luminous color by quantum size effect by changing its particle diameter to a nanometer-size diameter. For instance, InP emits red light when the particle size is approximately 3 nm to 4 nm. The particle size is measured under a transmission electron microscope (TEM).

The semiconductor nanoparticle fluorescent substance has a short fluorescence duration since it is semiconductor-based. The semiconductor nanoparticle fluorescent substance is, on the other hand, highly resistant to high power laser light since it can rapidly emit fluorescence with use of power of the laser light. This is because the light emission duration of the semiconductor nanoparticle fluorescent substance is approximately 10 nanoseconds, which duration is five digits smaller than that of a normal fluorescent substance which includes a rare earth as a luminescence center.

Since the light emission duration is short as described above, the semiconductor nanoparticle fluorescent substance can rapidly repeat absorption of laser light and light emission of the fluorescent substance. As a result, it is possible to (i) maintain high efficiency with respect to strong laser light and (ii) reduce heat generated by the fluorescent substance.

The above arrangement further prevents the light-emitting section 53 from being deteriorated (discolored and/or deformed) due to heat. Accordingly, in the case where the laser diodes 23 each having high optical output are used as excitation light sources, it is possible to effectively prevent the life of the light-emitting section 53 from being shortened.

The light-emitting section 53 may include a YAG:Ce fluorescent substance at a density of 4.8 g/cm$^3$ and a sealing material at a density of (i) 2.0 g/cm$^3$ or higher and 7.0 g/cm$^3$ or lower, or preferably at a density of (ii) 2.0 g/cm$^3$ or higher and 6.0 g/cm$^3$ or lower. This arrangement makes it possible to uniformly disperse the fluorescent substance in the sealing material for higher efficiency in use of excitation light. Further, the above arrangement, which allows the fluorescent substance to be uniformly dispersed in a low-melting glass, reduces the possibility of local deterioration of the light-emitting section 53 and thus makes it possible to produce a light-emitting section 53 that is high in long-term reliability.

The light-emitting section 53 has a shape and size of, for example, a column having a diameter of 3.2 mm and a thickness of 1 mm. The light-emitting section 53 has a laser light illuminated surface 53a (corresponding to the bottom surface of the column) at which to receive laser light emitted from the emission end section of each optical fiber 42a.

The light-emitting section 53 may alternatively be a cuboid in shape instead of a column. The cuboid is, for example, a 3 mm×1 mm×1 mm. In this case, the laser light illuminated surface 53a, which is irradiated with laser light, is 3 mm$^2$ in area. A light distribution pattern (light distribution) of a vehicle headlamp lawfully stipulated domestically in Japan is narrow in a vertical direction and broad in a horizontal direction. Thus, in order to easily achieve the light distribution pattern, the shape of the light-emitting section 53 is made wide in the horizontal direction (the cross section being substantially rectangular).

A required thickness of the light-emitting section 53 is varied in accordance with a ratio of the sealing material of the light-emitting section 53 to the fluorescent material thereof. The more the fluorescent material is contained in the light-emitting section 53, the higher an efficiency in conversion of the laser light to the white light becomes. Thus, an increase in a content of the fluorescent material in the light-emitting section 53 allows a reduction in thickness of the light-emitting section 53. Reducing the thickness of the light-emitting section 53 increases an effect of releasing heat toward the thermally conductive member 13. Reducing the thickness excessively, however, causes the laser light to be emitted directly to the outside without being converted into fluorescence. From the viewpoint of excitation light absorption by the fluorescent material, the light-emitting section 53 preferably has a thickness which is at least 10 times as large as a particle size of the fluorescent material.

From the above viewpoint, the light-emitting section 53 is simply required to have a thickness of 0.01·m or more in the case where it includes a nanoparticle fluorescent material. The thickness in this case is, however, preferably 10·m or more (0.01 mm or more) for ease of production steps such as dispersing the nanoparticle fluorescent material into the sealing material. Increasing the thickness of the light-emitting section 53 will, on the other hand, increase a shift from a focus point of the reflecting mirror 6, and consequently blur the light distribution pattern.

Thus, the light-emitting section 53 preferably has a thickness which is 0.2 mm or more and 2 mm or less in the case where the light-emitting section 53 includes an oxynitride fluorescent material. The lower limit of the thickness does not apply to the case in which the fluorescent material has an extremely large content (typically, in the case where the light-emitting section 53 contains 100% fluorescent material).

The laser light illuminated surface 53a of the light-emitting section 53 does not necessarily have to be a flat surface, and can be a curved surface. Note however that, in order to reduce reflection of laser light, it is preferable that the laser light illuminated surface 53a be a flat surface perpendicular to a light axis of the laser light.

As illustrated in FIGS. 5 and 6, the light-emitting section 53 is fixed, with use of the connecting layer 15, to a surface of the thermally conductive member 13 which surface is opposite from a surface thereof that is irradiated with laser light. The light-emitting section 53 is, as described above, preferably provided as thermally isolated from the laser diodes 23. A laser diode 23 that emits ultraviolet to blue laser light and that is used as an excitation light source typically has an energy conversion efficiency (optical power/supplied electric power×100) of approximately 20% to 30%. This means that the laser diodes 23 each convert 70% to 80% of its received electric power to heat. Thus, if the light-emitting section 53 is thermally connected to the laser diodes 23, heat generated by the laser diodes 23 may be conducted to the light-emitting section 53.

The description below assumes an example configuration in which a light-emitting section 53 is provided on a glass surface of a package containing laser diodes 23. With this configuration, heat generated by the laser diodes 23 as above is transferred from a cap section of the package to the glass surface and to the light-emitting section 53 easily. On the other hand, heat generated by the light-emitting section 53, under the assumption that the light-emitting section 53 contains a fluorescent substance having a conversion efficiency of 70%, corresponds to approximately 30% of energy of laser light emitted to the light-emitting section 53. This means that heat generated by the light-emitting section 53 is calculated by (i) multiplying electric power supplied to the laser diodes 23 by 20% to 30% (which is the energy conversion efficiency of the laser diodes 23) and (ii) further multiplying the product by 30% (which corresponds to the percentage by which the fluorescent substance converts energy of laser light) to approximately 6% to 9%. Thus, if electric power supplied to the laser diodes 23 is expressed as an index of 100, the light-emitting section 53 is heated at proportions of (i) 70 to 80 for heat from the laser diodes 23 and (ii) 6 to 9 for heat from the fluorescent substance.

As described above, if the light-emitting section 53 is thermally connected to the laser diodes 23, the light-emitting section 53 may be heated more by (i) heat generated by the laser diodes 23 than by (ii) heat generated by the fluorescent substance.

The light-emitting section 53 is thus preferably provided as thermally isolated from the laser diodes 23 so that heat generated by the laser diodes 23 will not be conducted to the light-emitting section 53. This arrangement can prevent the luminous efficiency from decreasing as a result of deterioration of the light-emitting section 53 due to heat generated by the laser diodes 23.

Repeatedly turning on and off the light-emitting section 53 by means of irradiation of laser light decreases the connecting force between the light-emitting section 53 and the thermally conductive member 13, and may even disconnect the light-emitting section 53 and the thermally conductive member 13 from each other. In view of this, the light-emitting section 53 of the headlamp 60 has a thermal expansion coefficient adjusted so that the light-emitting section 53, including a fluorescent substance dispersed therein, has a thermal expansion coefficient different from that of the thermally conductive member 13 by a certain value or less. The respective thermal expansion coefficients of the light-emitting section 53 and the thermally conductive member 13 will be described later in detail.

(Thermally Conductive Member 13)

The thermally conductive member 13 is so provided as to face the laser light illuminated surface 53a (that is, the surface irradiated with laser light) of the light-emitting section 53. The thermally conductive member 13 is a transparent, plate-shaped member for receiving heat of the light-emitting section 53. The thermally conductive member 13 is thermally connected to the light-emitting section 53 (that is, connected to the light-emitting section 53 so that thermal energy can be transferred therefrom). Specifically, the thermally conductive member 13 is, as illustrated in FIG. 6, connected to the light-emitting section 53 by means of the connecting layer 15.

The thermally conductive member 13 has (i) a first end section a portion close to which is in thermal contact with the laser light illuminated surface 53a of the light-emitting section 53 and (ii) a second end section thermally connected to the cooling section 14.

The thermally conductive member 13, which is shaped and connected as above, (i) holds a minute light-emitting section 53 at a light-emitting section fixing position and also (ii) releases heat generated by the light-emitting section 53.

The thermally conductive member 13 preferably has a thermal conductivity of 20 W/mK or more in order to efficiently release heat of the light-emitting section 53. Further, since laser light emitted from the emission end section of each optical fiber 42a passes through the thermally conductive member 13 to reach the light-emitting section 53, the thermally conductive member 13 is preferably made of a highly transparent material.

The thermally conductive member 13 is preferably made of a material such as sapphire ($Al_2O_3$), magnesia (MgO), gallium nitride (GaN), aluminium nitride (AlN), or spinel ($MgAl_2O_4$). Using one of these materials allows the thermally conductive member 13 to have a thermal conductivity of 20 W/mK or more.

The thermally conductive member 13 has a thickness indicated by reference sign "13c" in FIG. 6 (that is, the thickness of the thermally conductive member 13 between (i) a first surface facing the laser light illuminated surface 53a and (ii) a second surface 13b located oppositely from the first surface 13a). This thickness is preferably 0.3 mm or more and 3.0 mm or less.

If the thermally conductive member 13 has a thickness of less than 0.3 mm, it may (i) be unable to release heat of the light-emitting section 53 sufficiently and thus (ii) let the light-emitting section 53 be deteriorated. If the thermally conductive member 13 has a thickness of more than 3.0 mm, increased material costs for the thermally conductive member 13 cannot be justified by improvements made by the thermally conductive member 13 in the heat releasing effect. Further, if the thermally conductive member 13 has an extremely large thickness, the thermally conductive member 13 will absorb a large amount of laser light which the thermally conductive member 13 receives, and this leads to significantly reduced efficiency in use of excitation light.

The thermally conductive member 13, which has a suitable thickness and which is in contact with the light-emitting section 53, allows heat to be released rapidly and efficiently even in the case where the light-emitting section 53 is, in particular, irradiated with laser light so extremely strong that the light-emitting section 53 generates heat of more than 1 W. The above arrangement can thus prevent the light-emitting section 53 from being damaged (deteriorated).

The thermally conductive member 13 may be in the shape of a plate with no bend, or have a bent portion or curved portion. The light-emitting section 53 is, however, preferably flat (that is, in the shape of a flat plate) at a portion to which the light-emitting section 53 is connected. This arrangement allows the light-emitting section 53 to be connected to the thermally conductive member 13 securely.

The thermally conductive member 13 may have both (i) a portion having transparency (transparent section) and (ii) a portion having no transparency (light-blocking section). In the case where the thermally conductive member 13 is arranged as such, the transparent section is so located as to cover the laser light illuminated surface 53a of the light-emitting section 53, whereas the light-blocking section is so located as to surround the transparent section.

The light-blocking section may be (i) a heat releasing portion made of a metal (for example, copper or aluminum) or (ii) a transparent member having a surface provided with a film that reflects illuminating light, such as an aluminum film or a silver film.

(Cooling Section 14)

The cooling section 14 is a member for cooling the thermally conductive member 13. The cooling section 14 is, for example, a heat releasing block that is made of a metal such as aluminum, stainless steel, copper, or iron and that is thus high in heat conductivity. In the case where the reflecting mirror 6 is made of a metal, the reflecting mirror 6 may double as the cooling section 14. The cooling section 14 may alternatively be (i) a cooling device that cools the thermally conductive member 13 by circulating a coolant inside itself, or (ii) a cooling device (fan) that air-cools the thermally conductive member 13.

In the case where the cooling section 14 is a metal block, the metal block may include a plurality of heat releasing fins on a top surface. This arrangement increases the surface area of the metal block, and thus improves efficiency in heat release from the metal block.

The cooling section 14 is not essential to the headlamp 60. Heat received by the thermally conductive member 13 from the light-emitting section 53 may alternatively be allowed to release spontaneously from the thermally conductive member 13. Providing the cooling section 14, however, allows heat to be released efficiently from the thermally conductive member 13. The cooling section 14 is particularly useful in the case where the amount of heat from the light-emitting section 53 is 3 W or more.

Adjusting the length of the thermally conductive member 13 allows the cooling section 14 to be placed at a position away from the light-emitting section 53. In this case, the cooling section 14 is not necessarily contained in the housing 10 as illustrated in FIG. 5. The cooling section 14 may be placed outside the housing 10 with the thermally conductive member 13 penetrating the housing 10.

The above arrangement (i) allows the cooling section 14 to be placed at such a position that it can be easily repaired or replaced if broken down, and (ii) increases the freedom in design of the headlamp 60.

(Connecting Layer 15)

The connecting layer 15 is an adhesive layer filling the gap between the thermally conductive member 13 and the light-emitting section 53 (specifically, the laser light illuminated surface 53a). The connecting layer 15 preferably has a thermal conductivity equivalent to or higher than that of the light-emitting section 53. This arrangement allows heat generated by the light-emitting section 53 to be conducted to the thermally conductive member 13 efficiently, thereby improving the heat releasing effect. For instance, in the case where the sealing material of the light-emitting section 53 is an inorganic glass material, the connecting layer 15 may be made of (i) a glass paste including, for example, a low-melting glass or (ii) a glass paste including a highly heat conductive filler mixed therein.

The connecting layer 15 preferably has a flexibility (or a viscosity) sufficient to absorb a difference between the respective thermal expansion coefficients of the light-emitting section 53 and the thermally conductive member 13. In the case where the light-emitting section 53 has generated heat, the difference caused between the respective thermal expansion coefficients of the light-emitting section 53 and the thermally conductive member 13 causes a decrease in the connecting force between the light-emitting section 53 and the thermally conductive member 13. In view of this, the connecting layer 15, which has a flexibility (or a viscosity) sufficient to absorb a difference between the respective thermal expansion coefficients of the light-emitting section 53 and the thermally conductive member 13, can effectively prevent the connecting force between the light-emitting section 53 and the thermally conductive member 13 from decreasing as a result of the difference caused between the respective thermal expansion coefficients due to heat generated by the light-emitting section 53.

The connecting layer 15 preferably has a thickness (that is, the thickness between the thermally conductive member 13 and the laser light illuminated surface 53a) of 1·m or more and 30·m or less. In the case where the connecting layer 15 has a thickness of 1·m or more and 30·m or less, the connecting layer 15 has small thermal resistance even if the connecting layer 15 has a thermal conductivity lower than that of the light-emitting section 53. The above arrangement thus allows heat generated by the light-emitting section 53 to be transferred through the connecting layer 15 to the thermally conductive member 13 efficiently.

For instance, the connecting layer 15 ends up having an equal thermal resistance between (i) the case in which the connecting layer 15 has a thermal conductivity of 1 W/mK and a thickness of 0.1 mm and (ii) the case in which the connecting layer 15 has a thermal conductivity of 0.2 W/mK and a thickness of 20·m (=0.02 mm).

The connecting layer 15 may include a dispersing material 16. In the case where, for instance, the headlamp 60 uses only fluorescence as illuminating light, the connecting layer 15 includes a dispersing material 16 to prevent laser light from being emitted directly to the outside without being converted into fluorescence by the light-emitting section 53. This arrangement can thus diffuse laser light emitted from the light-guiding section 42.

With the above arrangement, even in the case where the light-emitting section 53 does not convert all laser light into fluorescence, dispersing laser light with use of the dispersing material 16 in advance makes it possible to reduce laser light emitted to the outside. The dispersing material 16 is made of a material such as (i) $SiO_2$ beads each having a spherical shape and a particle size of several nanometers to several micrometers (the $SiO_2$ beads being mixed in the connecting layer 15 at 0.1 to several percent), (ii) $Al_2O_3$ beads, or (iii) diamond beads.

If the dispersing material 16 is included in the connecting layer 15 in an excessively large amount, the dispersing material 16 will reduce laser light reaching the fluorescent substance contained in the light-emitting section 53. The dispersing material 16 is thus preferably included in an amount of approximately 1 mg to 30 mg per 1 g of the connecting layer 15.

Containing a transparent, inorganic substance such as the above also improves the thermal conductivity of the connecting layer 15. $SiO_2$ has a thermal conductivity of 1.38 W/mK, which is higher than that of acrylic resin. The diamond particles have a thermal conductivity that falls within a range between 800 and 2000 W/mK, which is significantly higher than that of acrylic resin. Containing a transparent, inorganic substance as above significantly improves the thermal conductivity of the connecting layer 15 in consequence.

(Transparent Plate 93)

The transparent plate 93 is a transparent resin plate that covers an opening of the reflecting mirror 6. The transparent plate 93 may be made of a material that blocks laser light emitted by the laser diodes 23 and that transmits white light generated by the light-emitting section 53 converting laser light. In the case where the headlamp 60 uses only fluorescence as illuminating light, the light-emitting section 53 converts most of the coherent laser light into incoherent white light (fluorescence). The laser light may, however, partially not be converted as such for some reason. In such a case, the transparent plate 93 may block laser light to prevent the laser light from being emitted to the outside.

The transparent plate 93 may be used to fix the light-emitting section 53 in combination with the thermally conductive member 13. In other words, the light-emitting section 53 may be sandwiched between the thermally conductive member 13 and the transparent plate 93. The transparent plate 93, in this case, functions as a fixing section for fixing a relative positional relationship between the light-emitting section 53 and the thermally conductive member 13.

Sandwiching the light-emitting section 53 between the thermally conductive member 13 and the transparent plate 93 more reliably fixes the light-emitting section 53 in position even if the connecting layer 15 has low connecting force. In this case, making the transparent plate 93 of a material having a thermal conductivity higher than that of the light-emitting section 53 allows the transparent plate 93 to produce an effect of releasing heat of the light-emitting section 53.

<Effect of Headlamp 60>

The description below deals with effects achieved by the headlamp 60. When the light-emitting section 53 of the headlamp 60 emits light in response to laser light, the excitation light is partially converted into heat, which causes the light-emitting section 53 to be heated. In view of this problem, the headlamp 60 includes a thermally conductive member 13 thermally connected to the light-emitting section 53. The thermally conductive member 13 thus receives heat of the light-emitting section 53 to release it. The headlamp 60, which includes this arrangement, can prevent the light-emitting section 53 from being deteriorated due to heat generated.

As mentioned above, repeatedly turning on and off the light-emitting section 53 by means of irradiation of laser light decreases the connecting force of the connecting layer 15 that connects the light-emitting section 53 and the thermally conductive member 13 to each other, and may even disconnect the light-emitting section 53 and the thermally conductive member 13 from each other. Specifically, since the light-emitting section 53 and the thermally conductive member 13 have respective thermal expansion coefficients different from each other when the light-emitting section 53 has been heated, this difference between the respective thermal expansion coefficients breaks the connection formed by the connecting layer 15.

The headlamp 60 is, in view of the above problem, arranged such that the light-emitting section 53, which includes a sealing material and a fluorescent substance dispersed therein, and the thermally conductive member 13 have respective thermal expansion coefficients adjusted so that the difference therebetween is $0.1 \times 10^{-6}/°$ C. or less.

The inventors of the present invention conducted experiments, with the result that in the case where the light-emitting section 53, which includes a fluorescent substance dispersed therein, and the thermally conductive member 13 have respective thermal expansion coefficients approximated so that the difference therebetween is $0.1 \times 10^{-6}/°$ C. or less as described above, it is possible to effectively prevent the connecting force between the light-emitting section 53 and the thermally conductive member 13 from decreasing due to the difference between the respective thermal expansion coefficients. This applies also to the case in which the light-emitting section 53 and the thermally conductive member 13 are connected to each other by means of the connecting layer 15 as in the headlamp 60.

The headlamp 60, which includes the above arrangement, has a difference of $0.1 \times 10^{-6}/°$ C. or less between the respective thermal expansion coefficients of (i) the light-emitting section 53, which includes a fluorescent substance dispersed therein, and (ii) the thermally conductive member 13. The headlamp 60 can thus effectively prevent the connecting force between the light-emitting section 53 and the thermally conductive member 13 from decreasing due to the difference between the respective thermal expansion coefficients.

Consequently, the headlamp 60 prevents generated heat from deteriorating the light-emitting section 53 and from decreasing the connecting force between the light-emitting section 53 and the thermally conductive member 13, and is thus capable of emitting light with high efficiency over an extended period of time.

(Thermal Expansion Coefficients of Light-Emitting Section 53 and Thermally Conductive Member 13)

The description below deals with the respective thermal expansion coefficients of the light-emitting section 53 and the thermally conductive member 13. Typically, the fluorescent substance has a thermal expansion coefficient lower than that of the thermally conductive member 13 made of sapphire or the like: For example, a phosphide (InP) of a III-V compound semiconductor nanoparticle fluorescent substance has a thermal expansion coefficient of $4.5\times10^{-6}/°$ C., and a nitride (GaN) thereof has a thermal expansion coefficient of $6.0\times10^{-6}/°$ C., whereas sapphire has a thermal expansion coefficient of $7.0\times10^{-6}/°$ C. Thus, even if the sealing material has a thermal expansion coefficient matched by that of the thermally conductive member 13, the light-emitting section 53, which includes a fluorescent substance dispersed therein, ends up having a thermal expansion coefficient lower than that of the thermally conductive member 13. This makes it impossible to sufficiently prevent the connecting force between the light-emitting section 53 and the thermally conductive member 13 from decreasing due to the above difference between the respective thermal expansion coefficients.

The headlamp 60 is, in view of the above problem, arranged such that the light-emitting section 53, which includes a sealing material and a fluorescent substance dispersed therein, and the thermally conductive member 13 have respective thermal expansion coefficients adjusted so that the difference therebetween is $0.1\times10^{-6}/°$ C. or less. Since the light-emitting section 53 is a member including a fluorescent substance dispersed in a sealing material, changing the thermal expansion coefficient of the sealing material, for example, can adjust the thermal expansion coefficient of the light-emitting section 53.

The thermally conductive member 13 of the headlamp 60 is suitably made of a material such as (i) sapphire ($Al_2O_3$), which has a thermal expansion coefficient of $7.0\times10^{-6}/°$ C. (in the direction perpendicular to the C axis), (ii) magnesia (MgO), which has a thermal expansion coefficient of $13.3\times10^{-6}/°$ C., (iii) gallium nitride (GaN), which has a thermal expansion coefficient of $5.6\times10^{-6}/°$ C., or (iv) aluminium nitride (AlN), which has a thermal expansion coefficient of $4.6\times10^{-6}/°$ C.

The description below deals with an example case involving (i) a thermally conductive member 13 made of sapphire ($Al_2O_3$), which has a thermal expansion coefficient of $7.0\times10^{-6}/°$ C., and (ii) an oxynitride fluorescent substance having a thermal expansion coefficient of $2.6\times10^{-6}/°$ C. (for example, a sialon fluorescent substance such as Ca.—SiA-lON:Ce.—SiAlON:Eu), the oxynitride fluorescent substance being dispersed in a sealing material at a volume ratio of 20% with respect to the sealing material.

In this case, the sealing material needs to have a thermal expansion coefficient x found by $(x\times0.8)+(2.6\times10^{-6}\times0.2)=7.0\times10^{-6}$, therefore $8.1\times10^{-6}/°$ C., in order for the difference between the respective thermal expansion coefficients of (i) the light-emitting section 53, which includes a fluorescent substance dispersed therein, and (ii) the thermally conductive member 13 to be $0.1\times10^{-6}/°$ C. or less.

Thus, (i) selecting a sealing material having a thermal expansion coefficient of approximately $8.1\times10^{-6}/°$ C. and (ii) dispersing an oxynitride fluorescent substance in the selected sealing material at a volume ratio of 20% can produce a light-emitting section 53 having a thermal expansion coefficient adjusted so that the difference between the thermal expansion coefficient of the thermally conductive member 13 and itself is $0.1\times10^{-6}/°$ C. or less.

As described above, appropriately selecting a sealing material having a necessary thermal expansion coefficient in accordance with (i) the material of the thermally conductive member 13 and (ii) the kind, content and/or the like of the fluorescent substance can adjust the thermal expansion coefficient of the light-emitting section 53 so that the difference between the respective thermal expansion coefficients of the light-emitting section 53 and the thermally conductive member 13 is $0.1\times10^{-6}/°$ C. or less.

Alternatively, the thermal expansion coefficient of the thermally conductive member 13 may instead be changed in accordance with the thermal expansion coefficient of the light-emitting section 53 so that the difference between the respective thermal expansion coefficients of the light-emitting section 53 and the thermally conductive member 13 is $0.1\times10^{-6}/°$ C. or less.

Modification Examples

The description below deals with modification examples of the headlamp 60 with reference to FIGS. 7 and 8.

Figure 7:
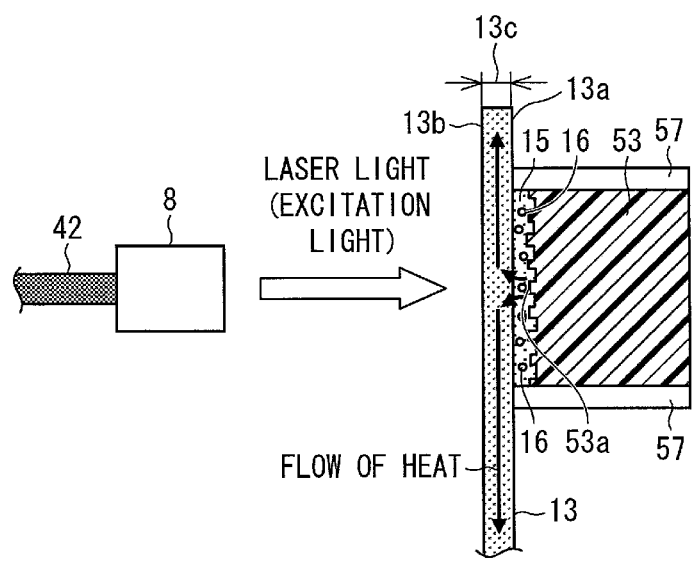
FIG. 7 is a cross-sectional view illustrating a modification example of the light-emitting section illustrated in FIG. 6.

FIG. 7 is a cross-sectional view illustrating a modification example of the light-emitting section 53 illustrated in FIG. 6. As illustrated in FIG. 7, the light-emitting section 53 and the connecting layer 15 may each have a side surface provided with a reflection coating 57. The reflection coating 57 is a light-reflecting film that covers at least a portion of an outward surface of the connecting layer 15 (the outward surface being a surface that is in contact with neither the light-emitting section 53 nor the thermally conductive member 13). The reflection coating 57 is, for example, a metal thin film such as an aluminum thin film.

Since the connecting layer 15 includes a dispersing material 16, the laser light is diffused by the dispersing material 16. This results in generation of laser light (hereinafter referred to as "stray light") that does not travel in the direction of the light-emitting section 53 and that instead leaks out from the side surface of the connecting layer 15. With the above arrangement, however, the stray light is reflected by the reflection coating 57, provided on the side surface of the connecting layer 15, and thus travels toward inner side of the connecting layer 15 (i.e., toward the light-emitting section 53). This improves efficiency in use of laser light.

The reflection coating 57 is simply required to cover the side surface of at least the connecting layer 15, and is thus not required to further cover the side surface of the light-emitting section 53. Covering the side surface of the light-emitting section 53 with the reflection coating 57, however, allows the reflection coating 57 to cool the light-emitting section 53. This effect can be improved by making the reflection coating 57 of a material having a heat conductivity higher than that of the light-emitting section 53.

Figure 8:
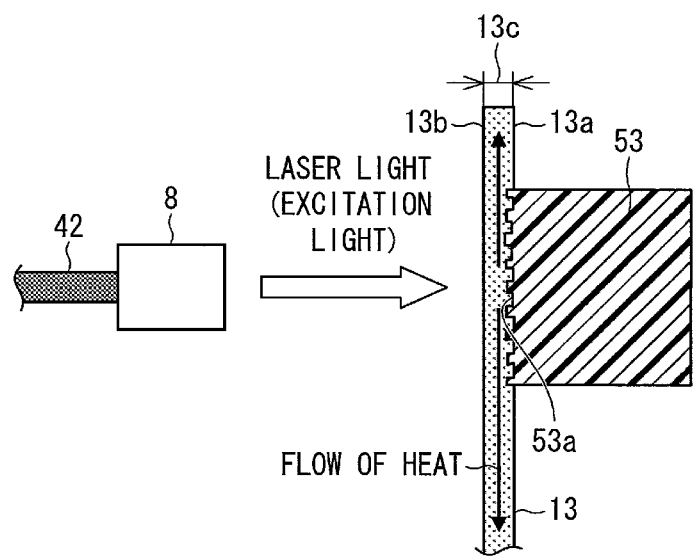
FIG. 8 is a cross-sectional view illustrating a modification example of how a light-emitting section and a thermally conductive member illustrated in FIG. 6 are connected to each other.

FIG. 8 is a cross-sectional view illustrating a modification example of a structure of connection between the light-emitting section 53 and the thermally conductive member 13 both illustrated in FIG. 6. As illustrated in FIG. 8, the connecting layer 15 may be omitted so that the light-emitting section 53 and the thermally conductive member 13 are connected to each other directly. For instance, the light-emitting section 53 and the thermally conductive member 13 may be connected to each other in the state where minute concave sections in the first surface 13a of the thermally conductive member 13 are engaged with the laser light illuminated surface 53a of the light-emitting section 53.

Even in this case, adjusting the respective thermal expansion coefficients of (i) the light-emitting section 53, which includes a fluorescent substance dispersed therein, and (ii) the thermally conductive member 13 so that the difference therebetween is $0.1\times10^{-6}/°$ C. or less can effectively prevent the connecting force between the light-emitting section 53 and the thermally conductive member 13 from decreasing due to the difference between the respective thermal expansion coefficients.

Example

Figure 9:
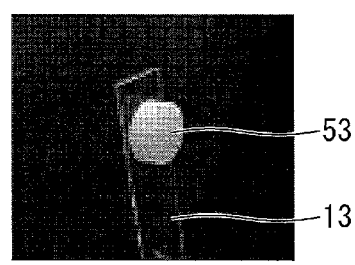
FIG. 9 is a perspective view illustrating a concrete example of a state in which the light-emitting section and the thermally conductive member illustrated in FIG. 6 are being connected to each other.

The description below deals with an Example of the present invention with reference to FIG. 9. FIG. 9 is a perspective view illustrating a specific example of how the light-emitting section 53 and the thermally conductive member 13 both illustrated in FIG. 6 are connected to each other.

The thermally conductive member 13 illustrated in FIG. 9 was a 0.5 mm-thick member made of sapphire ($Al_2O_3$), which has a thermal expansion coefficient of $7.0\times10^{-6}/°$ C. The light-emitting section 53 was adhered to the thermally conductive member 13 by using Epixacolle EP433 (visible light polymerizable optical adhesive manufactured by Adell Corporation) as the connecting layer 15.

The light-emitting section 53 included, (i) as a sealing material, Ohara Inc.'s L-LAM 72 (thermal expansion coefficient: $8.2\times10^{-6}/°$ C., transition point (Tg): 565° C.) and (ii) Ca.—SiAlON:Ce (thermal expansion coefficient: $2.6\times10^{-6}/°$ C.) dispersed in the inorganic glass at a volume ratio of 20%. The light-emitting section 53 was in the shape of a disc having a diameter of 3 mm and a thickness of 1.5 mm.

The light-emitting section 53 had a thermal expansion coefficient of $(8.2\times10^{-6}\times0.8)+(2.6\times10^{-6}\times0.2)=7.08\times10^{-6}$. The difference between (i) the thermal expansion coefficient of the light-emitting section 53 ($7.08\times10^{-6}$) and (ii) that of the thermally conductive member 13 ($7.0\times10^{-6}/°$ C.) was $0.08\times10^{-6}/°$ C.

As described above, adjusting the thermal expansion coefficient of the light-emitting section 53, which includes a fluorescent substance dispersed therein, so that the difference between the respective thermal expansion coefficients of the light-emitting section 53 and the thermally conductive member 13 is $0.1\times10^{-6}/°$ C. or less can effectively prevent the connecting force between the light-emitting section 53 and the thermally conductive member 13 from decreasing due to the difference between the respective thermal expansion coefficients.

The present Example may alternatively be arranged to replace L-LAM 72 with, for example, HOYA Corporation's BACD18 (thermal expansion coefficient: $8.1\times10^{-6}/°$ C.) or E-LAF7 (thermal expansion coefficient: $8.2\times10^{-6}/°$ C.) for use as a sealing material.

Embodiment 4

Figure 10:
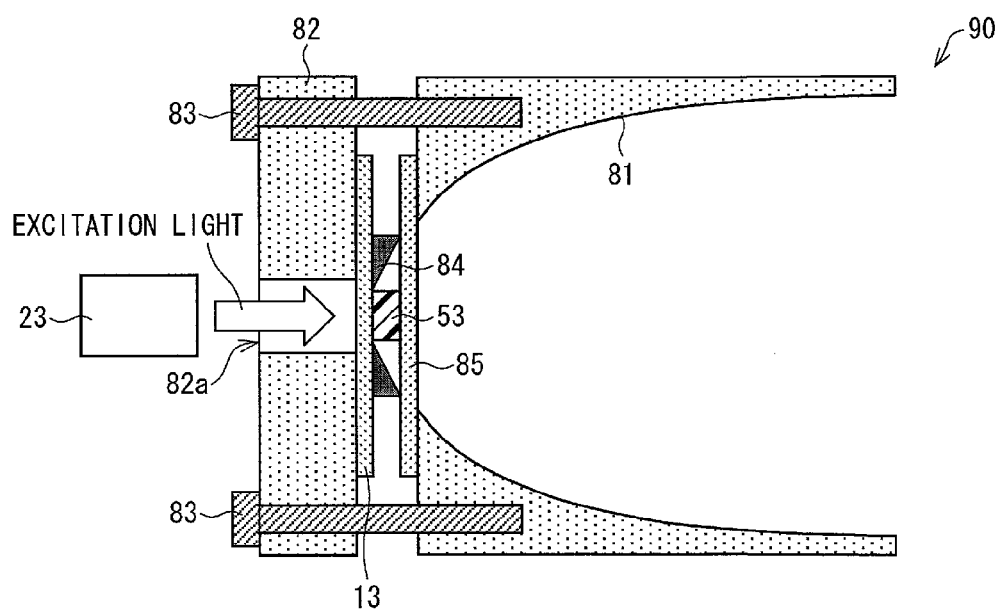
FIG. 10 is a cross-sectional view schematically illustrating a configuration of a headlamp in accordance with still another embodiment of the present invention.

The following description will discuss another embodiment of the present invention, with reference to FIG. 10. Note that the same reference numerals are given to members which are similar to those of Embodiments 1 through 3, and descriptions of such members are omitted here. The present embodiment describes another example of a member for use in sandwiching the light-emitting section 53 in combination with the thermally conductive member 13.

<Configuration of Headlamp 90>

FIG. 10 is a cross-sectional view illustrating a configuration of a headlamp 90 of the present embodiment. The headlamp 90, as illustrated in FIG. 10, includes a reflecting mirror 81, a substrate 82, screws 83, a metal ring 84, and a transparent plate 85. The headlamp 90 is arranged such that the light-emitting section 53 is sandwiched between the thermally conductive member 13 and the transparent plate 85.

(Reflecting Mirror 81)

The reflecting mirror 81 is similar in function to the reflecting mirror 6. The reflecting mirror 81 has a shape formed by cutting the reflecting mirror 6 along a plane that is (i) at a position near the focal point of the reflecting mirror 6 and that is (ii) perpendicular to the optical axis. The reflecting mirror 81 is not particularly limited in terms of material. To achieve sufficient reflectance, however, the reflecting mirror 81 is preferably produced by (i) making a reflecting mirror 81 of copper or SUS (stainless steel) and then (ii) providing silver plating, chromate coating and the like to the reflecting mirror. Alternatively, the reflecting mirror 81 may be produced by (i) making a reflecting mirror of aluminum and (ii) providing an antioxidant film to a surface of the reflecting mirror. The reflecting mirror 81 may further alternatively be produced by (i) making a reflecting mirror of resin and (ii) forming a metal thin film on a surface of the reflecting mirror.

(Metal Ring 84)

The metal ring 84 is a ring in the shape of a mortar having an opening in a bottom section. The metal ring 84 (i) supplements the reflecting mirror 81 to constitute a complete (uncut) reflecting mirror and (ii) corresponds in shape to a part near the focal point of the complete reflecting mirror. The light-emitting section 53 is provided in the opening of the bottom section.

The metal ring 84 includes a mortar-shaped portion having a surface that functions as a reflecting mirror. The metal ring 84 combines with the reflecting mirror 81 to constitute a reflecting mirror that is complete in shape. The metal ring 84 is thus a partial reflecting mirror that functions as a part of a reflecting mirror. In the case where the reflecting mirror 81 is referred to as a "first partial reflecting mirror," the metal ring 84 can be referred to as a "second partial reflecting mirror" corresponding to the part near the focal point. When the light-emitting section 53 emits fluorescence, a portion of the fluorescence is reflected by the surface of the metal ring 84, and is thus emitted as illuminating light in the front direction of the headlamp 90.

The metal ring 84 is not particularly limited in terms of material, but is preferably made of a material such as silver, copper, and aluminum for sufficient heat releasing. The metal ring 84 is, in the case where it is made of silver or aluminum, preferably produced by (i) providing a mirror finish to the mortar-shaped portion and then (ii) providing a protecting layer (for example, a chromate coating or resin layer) to the mortar-shaped portion for protection against blackening and oxidation. The metal ring 84 is, in the case where it is made of copper, preferably produced by (i) carrying out silver plating or aluminum deposition and then (ii) providing the above protecting layer.

The light-emitting section 53 is adhered to the thermally conductive member 13 via the connecting layer 15 (not shown in FIG. 10). The metal ring 84 is in contact with the thermally conductive member 13 as well. The metal ring 84, in contact with the thermally conductive member 13, produces an effect of cooling the thermally conductive member 13. In other words, the metal ring 84 also functions as a cooling section for cooling the thermally conductive member 13.

(Transparent Plate 85)

The metal ring 84 and the reflecting mirror 81 sandwich the transparent plate 85. The transparent plate 85 is in contact with a surface of the light-emitting section 53 which surface is opposite to the laser light illuminated surface. The transparent plate 85 thus serves to press the light-emitting section 53 against the thermally conductive member 13 so that the light-emitting section 53 will not be detached from the thermally conductive member 13. The mortar-shaped portion of the metal ring 84 has a depth that is substantially identical to the height of the light-emitting section 53. The transparent plate 85 is thus in contact with the light-emitting section 53 while the transparent plate 85 is separated from the thermally conductive member 13 by a fixed distance. As such, there is no possibility that the light-emitting section 53 will be crushed by the thermally conductive member 13 and the transparent plate 85, which sandwich the light-emitting section 53 together.

The transparent plate 85 may be made of any material that is at least transparent. The transparent plate 85 is, however, preferably has a high thermal conductivity (20 W/mK or more) as with the thermally conductive member 13. The transparent plate 85 preferably includes, for example, sapphire, gallium nitride, magnesia, or diamond. The transparent plate 85 in this case has a thermal conductivity higher than that of the light-emitting section 53. The transparent plate 85 thus efficiently absorbs heat generated by the light-emitting section 53, and consequently cools the light-emitting section 53.

The thermally conductive member 13 and the transparent plate 85 each preferably have a thickness of approximately 0.3 mm or more and 3.0 mm or less. If the thickness is less than 0.3 mm, the thermally conductive member 13 and the transparent plate 85 cannot sandwich the light-emitting section 53 and the metal ring 84 with a force sufficient to fix them. If the thickness is more than 3.0 mm, the thermally conductive member 13 and the transparent plate 85 will (i) absorb more than an ignorable level of the laser light and (ii) be more expensive as well.

(Substrate 82)

The substrate 82 is a plate-shaped member having an opening 82a through which the laser light emitted by the laser diodes 23 passes. The reflecting mirror 81 is fixed to the substrate 82 with the screws 83. The reflecting mirror 81 is placed away from the substrate 82 as separated by the thermally conductive member 13, the metal ring 84, and the transparent plate 85. The opening 82a has its center that substantially coincides with the center of the opening in the bottom section of the metal ring 84. As such, the oscillating laser light emitted by the laser diodes 23 passes through the opening 82a of the substrate 82, the thermally conductive member 13, and the opening of the metal ring 84 to reach the light-emitting section 53.

The substrate 82 is not particularly limited in terms of material. However, in the case where the substrate 82 is made of a metal having high thermal conductivity, the substrate 82 can also function as a cooling section for cooling the thermally conductive member 13. The thermally conductive member 13 is in contact in its entirety with the substrate 82. Thus, in the case where the substrate 82 is made of a metal such as iron and copper, it is possible to more efficiently cool the thermally conductive member 13 and consequently cool the light-emitting section 53.

The metal ring 84 is preferably securely fixed to the thermally conductive member 13. The metal ring 84 can be fixed to the thermally conductive member 13 to a certain extent with use of pressure caused by fixing the reflecting mirror 81 to the substrate 82 with the screws 83. However, the risk of the light-emitting section 53 being detached due to a positional shift of the metal ring 84 can be avoided by securely fixing the metal ring 84 by a method of, for example, (i) adhering the metal ring 84 to the thermally conductive member 13 with use of an adhesive or (ii) screwing the metal ring 84 to the substrate 82 via the thermally conductive member 13.

The metal ring 84 is simply required to (i) function as the above-mentioned partial reflecting mirror and (ii) withstand the pressure caused by fixing the reflecting mirror 81 to the substrate 82 with the screws 83. The metal ring 84 may be replaced with a ring that is not made of a metal. The metal ring 84 may be replaced with, for example, a resin ring that withstands the above pressure and that has a surface provided with a metal thin film.

<Effect of Headlamp 90>

The headlamp 90, which includes the above arrangement, also has a difference of $0.1 \times 10^{-6}/°$ C. or less between the respective thermal expansion coefficients of (i) the light-emitting section 53, which includes a fluorescent substance dispersed therein, and (ii) the thermally conductive member 13. The headlamp 60 can thus effectively prevent the connecting force between the light-emitting section 53 and the thermally conductive member 13 from decreasing due to the difference between the respective thermal expansion coefficients.

Further, the headlamp 90 is arranged such that the light-emitting section 53 is sandwiched between the thermally conductive member 13 and the transparent plate 85 for a fixed relative positional relationship between the light-emitting section 53 and the thermally conductive member 13. This arrangement can, even in the case where the connecting layer 15 has low adhesiveness, effectively prevent the light-emitting section 53 from being detached from the thermally conductive member 13.

Embodiment 5

The following description will discuss another embodiment of the present invention, with reference to FIGS. 11 through 18. Note that the same reference numerals are given to members which are similar to those of the embodiments above, and descriptions of such members are omitted here.

The present embodiment discusses a laser downlight 200 as an example of the illuminating device of the present invention. The laser downlight 200 is an illuminating device installed on a ceiling of a structure such as a building or a vehicle. The laser downlight 200 uses, as illuminating light, light emitted upon irradiation of the light-emitting section 53 with laser light emitted by a laser diode 23.

Note that an illuminating device having a similar configuration to the laser downlight 200 may be installed on a side wall or on a floor of the structure. Where the illuminating device is installed is not particularly limited.

<Configuration of Laser Downlight 200>

Figure 11:
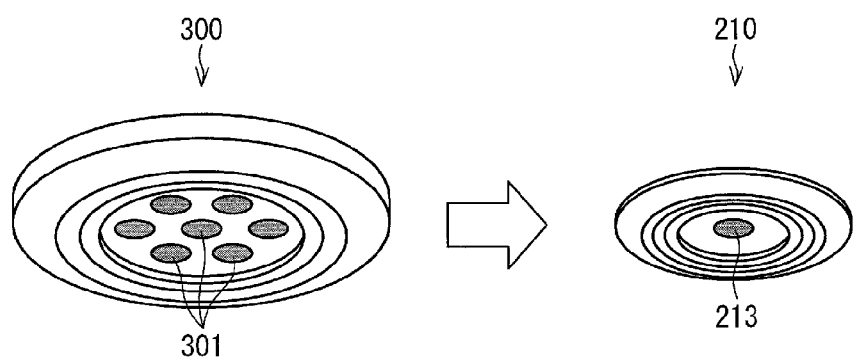
FIG. 11 is a perspective view illustrating an appearance of each of (i) a light-emitting unit included in a laser downlight in accordance with an embodiment of the present invention and (ii) a conventional LED downlight.
Figure 12:
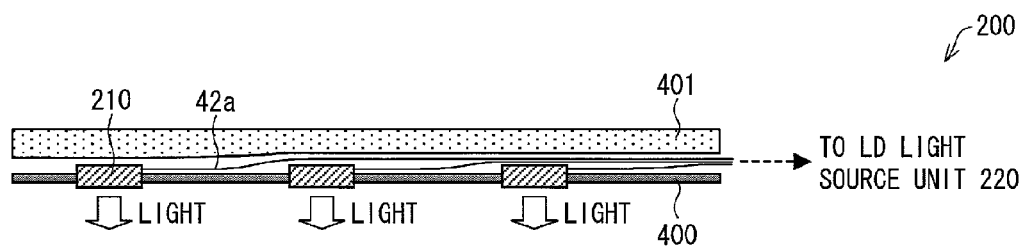
FIG. 12 is a cross-sectional view illustrating a ceiling on which the laser downlight is installed.
Figure 13:
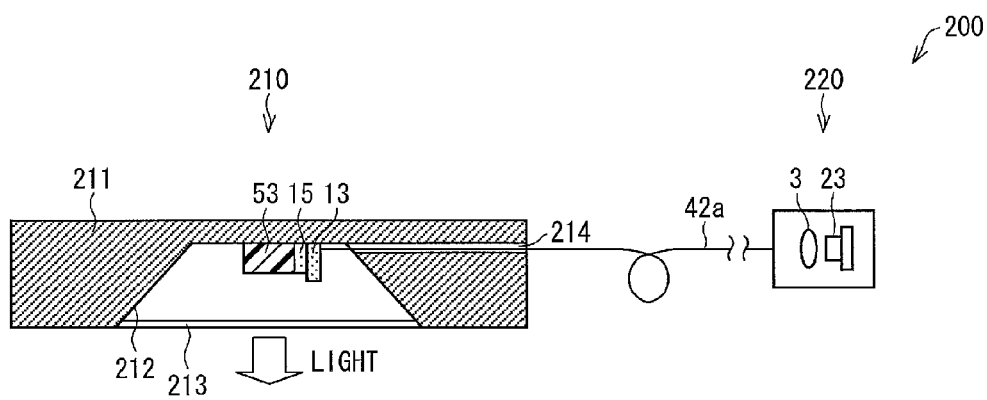
FIG. 13 is a cross-sectional view of the laser downlight illustrated in FIG. 12.

FIG. 11 is a perspective view illustrating an appearance of each of (i) a light-emitting unit 210 included in the laser downlight 200 in accordance with the present embodiment and (ii) a conventional LED downlight 300. FIG. 12 is a cross-sectional view illustrating a ceiling on which the laser downlight 200 is installed. FIG. 13 is a cross-sectional view of the laser downlight 200.

The laser downlight 200 includes (i) a light-emitting unit 210 which is embedded in a ceiling panel 400 and emits illuminating light and (ii) an LD light source unit 220 which supplies laser light to the light-emitting unit 210 via the optical fiber 42a (see FIGS. 11 through 13). The LD light source unit 220 is not disposed on the ceiling but is disposed in a location (e.g., a side wall of building) where a user can easily touch. The LD light source unit 220 can be freely located as such because the LD light source unit 220 is connected with the light emitting unit 210 via the optical fiber 42a. The optical fiber 42a is disposed in a gap between the ceiling panel 400 and a heat insulating material 401.

(Light-Emitting Unit 210)

The light-emitting unit 210 includes a housing 211, a light-emitting section 53, a thermally conductive member 13, and a light transmitting plate 213 (see FIG. 13).

The light-emitting section 53 is adhered to the thermally conductive member 13 via the connecting layer 15. As with the above described embodiments, heat of the light-emitting section 53 is transferred to the thermally conductive member 13, and the heat is thereby released.

The housing 211 has a concave section 212, and the light-emitting section 53 is disposed on a bottom surface of the concave section 212. The concave section 212 has a metal thin film formed on its surface, and therefore the concave section 212 functions as a reflecting mirror.

The housing 211 includes a path 214 formed to cause the optical fiber 42a to pass through, and the optical fiber 42a extends to the thermally conductive member 13 via the path 214. Laser light emitted from the emission end section of the optical fiber 42a passes through the thermally conductive member 13 and the connecting layer 15 and then reaches the light-emitting section 53.

The light transmitting plate 213 is a transparent or translucent plate which is provided so as to cover an opening of the concave section 212. The light transmitting plate 213 has a function similar to that of the transparent plate 93, and light emitted from the light-emitting section 53 passes through the light transmitting plate 213 and is then emitted as illuminating light. The light transmitting plate 213 may be detachably provided to the housing 211 or may be omitted.

In FIG. 11, the light-emitting unit 210 has a circular outer edge. Note, however, that the light-emitting unit 210 (more precisely, the housing 211) is not particularly limited in terms of shape.

Unlike a headlamp, a downlight does not require an ideal point light source, and can simply include a single light-emitting point. Therefore, the light-emitting section 53 has fewer restrictions in terms of shape, size, and location than does a headlamp.

(LD Light Source Unit 220)

The LD light source unit 220 includes a laser diode 23 and an aspheric lens 3.

The LD light source unit 220 is connected with the entrance end section of the optical fiber 42a, and oscillating laser light emitted by the laser diode 23 enters the entrance end section of the optical fiber 42a via the aspheric lens 3.

The LD light source unit 220 illustrated in FIG. 12 contains a single pair of the laser diode 23 and the aspheric lens 3. Note, however, that, in a case where a plurality of light-emitting units 210 are provided, optical fibers 42a extending from the respective plurality of light-emitting units 210 can be tied into a bundle to be connected to a single LD light source unit 220. In this case, the single LD light source unit 220 contains plural pairs of (i) the plurality of laser diodes 23 and (ii) the aspheric lenses 3 so as to function as a central power supply box.

<Modification Example of how to Install Laser Downlight 200>

Figure 14:
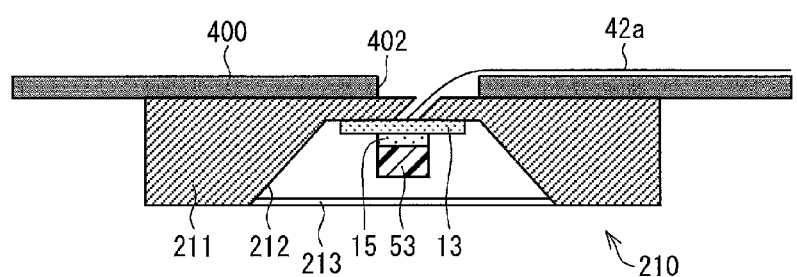
FIG. 14 is a cross-sectional view illustrating a modification example of how to install the laser downlight illustrated in FIG. 13.

FIG. 14 is a cross-sectional view illustrating a modification example of how to install the laser downlight 200 illustrated in FIG. 13. As illustrated in FIG. 14, the modification example of the installation method of the laser downlight 200 may include (i) opening a small hole 402 in the ceiling panel 400 for allowing the optical fiber 42a to pass through and (ii) attaching a laser downlight body (the light-emitting unit 210) to the ceiling panel 400 by taking advantage of features of the light-emitting unit 210, i.e., by taking advantage of reduced thickness and light weight of the light-emitting unit 210. In this case, it is possible to obtain advantage that restrictions on the installation of the laser downlight 200 becomes less significant and installation cost can be drastically reduced.

According to the configuration, the thermally conductive member 13 is provided on the bottom part of the housing 211 such that a laser light entrance side surface of the thermally conductive member 13 is in entire contact with the bottom part of the housing 211. With the configuration, in a case where the housing 211 is made of a material having a high thermal conductivity, the housing 211 can serve as a cooling section for the thermally conductive member 13.

(Comparison of Laser Downlight 200 and Conventional LED Downlight 300)

As illustrated in FIG. 11, the conventional LED downlight 300 includes a plurality of transparent plates 301, and illumination light is emitted via individual transparent plates 301. That is, the LED downlight 300 has a plurality of light-emitting points. The reason why the LED downlight 300 has a plurality of light-emitting points is that (i) luminous flux of light emitted from individual light-emitting points is relatively small and (ii) a plurality of light-emitting points therefore need to be provided in order to obtain light with luminous flux sufficient as illuminating light.

On the other hand, the laser downlight 200 is an illuminating device with high luminous flux, and therefore the number of light-emitting point may be one. This brings about an effect that illuminating light makes shades and shadows be clearly viewed. Further, by using high color rendering fluorescent substances (e.g. any combination of plural kinds of oxynitride fluorescent substances) in the light-emitting section 53, it is possible to improve color rendering property of illuminating light.

This makes it possible to achieve high color rendering almost equal to that of an incandescent bulb. For example, light with high color rendering (general color rendering index Ra is 90 or more and special color rendering index R9 is 95 or more) which is difficult to be achieved by an LED downlight or a fluorescent lamp downlight can be achieved by combining a high color rendering fluorescent substance with the laser diode 23.

Figures 15, 16:
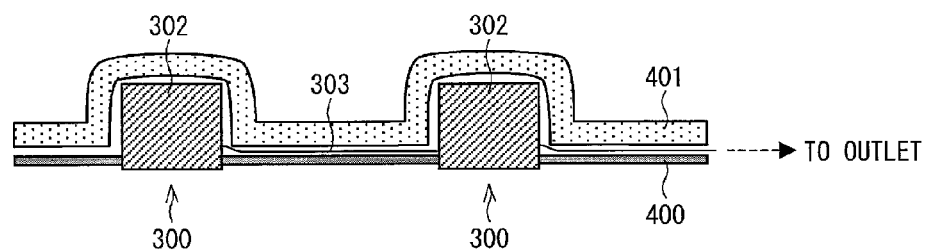
FIG. 15 is a cross-sectional view illustrating a ceiling on which the conventional LED downlight illustrated in FIG. 11 is installed.
FIG. 16 is a table for comparing specifications of the laser downlight and the conventional LED downlight which are illustrated in FIG. 11.

FIG. 15 is a cross-sectional view of a ceiling where the conventional LED downlights 300 each illustrated in FIG. 11 are installed. As illustrated in FIG. 15, in each of the LED downlights 300, a housing 302 containing an LED chip, a power source, and a cooling unit is embedded in the ceiling panel 400. The housing 302 is relatively large, and the heat insulating material 401 has a recess (i) whose shape corresponds to the shape of the housing 302 and (ii) in which the housing 302 is provided. A power source line 303 extends from the housing 302 and is connected with an outlet (not illustrated).

Such a conventional configuration causes the following problems. First, since the light source (LED chip) and the power source which generate heat are provided between the ceiling panel 400 and the heat insulating material 401, use of the LED downlight 300 results in an increase in temperature of the ceiling, and efficiency of cooling a room is accordingly decreased.

Moreover, the LED downlight 300 requires the power source and the cooling unit for each light source, and therefore total cost is increased.

Furthermore, since the housing 302 is relatively large in size, it is often difficult to provide the LED downlight 300 in the gap between the ceiling panel 400 and the heat insulating material 401.

On the other hand, in the laser downlight 200, the light-emitting unit 210 does not include a large heat source, and therefore does not decrease the efficiency of cooling the room. This makes it possible to avoid an increase in cost for cooling the room.

Further, in the laser downlight 200, it is unnecessary to provide a power source and a cooling unit for each light-emitting unit 210, and therefore the laser downlight 200 can be made small and thin. This reduces a restriction on a space where the laser downlight 200 is to be installed, and it is therefore possible to easily install the laser downlight 200 into an existing house.

Further, since the laser downlight 200 is small and thin, the light-emitting unit 210 can be provided on a surface of the ceiling panel 400 as described above. This allows (i) a reduction in restriction on installation of the laser downlight 200 and (ii) a great reduction in cost for the installation, as compared with installation of the LED downlight 300.

FIG. 16 is a table for comparing specifications of the laser downlight 200 and the conventional LED downlight 300 illustrated in FIG. 11. According to an example illustrated FIG. 16, a volume of the laser downlight 200 is reduced by 94% and a mass of the laser downlight 200 is reduced by 86%, as compared with the LED downlight 300.

Since the LD light source unit 220 can be provided in a location where a user can easily touch, it is possible to replace the laser diode 23 easily when the laser diode 23 is broken. Further, by leading the optical fibers 42a extending from the plurality of light emitting units 210 to one (1) LD light source unit 220, it is possible to manage the plurality of laser diodes 23 all together. Therefore, even in a case where a plurality of laser diodes 23 are to be replaced with new ones, it is possible to easily carry out such replacements.

Note that, in a case where the LED downlight 300 uses a high color rendering fluorescent substance, the LED downlight 300 emits luminous flux of approximately 500 lm at a power consumption of 10 W. On the other hand, the laser downlight 200 requires optical power of 3.3 W in order to achieve the same brightness of light. This optical power corresponds to a power consumption of 10 W if LD efficiency is 35%. The power consumption of the LED downlight 300 is also 10 W, and therefore there is no significant difference in power consumption between the laser downlight 200 and the LED downlight 300. Therefore, the laser downlight 200 obtains the various advantages as above described, with the same power consumption as that of the LED downlight 300.

<Effect of Laser Downlight 200>

As described above, the laser downlight 200 includes (i) the LD light source unit 220 including at least one laser diode 23 for emitting laser light, (ii) at least one light emitting unit 210 including the light-emitting section 53 and the concave section 212 serving as a reflection mirror, and (iii) the optical fiber 42a which guides the laser light to each of the at least one light emitting unit 210.

In a case where the laser downlight 200 having such a configuration is configured such that a difference between (i) a thermal expansion coefficient of the light-emitting section 53 in which the fluorescent substance is dispersed and (ii) a thermal expansion coefficient of the thermally conductive member 13 is 0.1×10$^{-6}$/° C., it is possible to efficiently suppress a decrease in connecting force between the light-emitting section 53 and the thermally conductive member 13, which decrease is caused due to a difference in thermal expansion coefficient.

<Modification Example of Laser Downlight 200>

Figure 17:
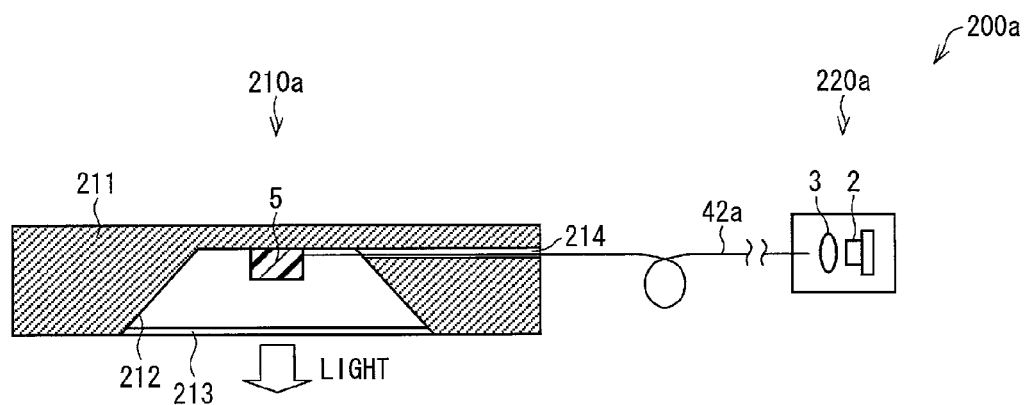
FIG. 17 is a cross-sectional view illustrating a modification example of the laser downlight illustrated in FIG. 13.

FIG. 17 is a cross-sectional view illustrating a modification example of the laser downlight 200 illustrated in FIG. 13. As illustrated in FIG. 17, the laser downlight 200a includes a light-emitting unit 210a for emitting illuminating light and an LD light source unit 220a for supplying laser light to the light-emitting unit 210a via an optical fiber 42a.

(Configuration of Light-Emitting Unit 210a)

The light-emitting unit 210a includes a housing 211, a light-emitting section 5, and a light transmitting plate 213. Unlike the light-emitting unit 210, the light-emitting unit 210a (i) includes the light-emitting section 5 instead of the light-emitting section 53 and (ii) does not include the thermally conductive member 13 and the connecting layer 15.

(Configuration of LD Light Source Unit 220a)

The LD light source unit 220a includes a laser diode 2 and an aspheric lens 3. Unlike the LD light source unit 220, the LD light source unit 220a includes the laser diode 2 instead of the laser diode 23.

According to the laser downlight 200a, the light-emitting section 5 of the light-emitting unit 210a contains (i) the YAG:Ce fluorescent substance whose density is 4.8 g/cm$^3$ and (ii) the sealing material whose density is 2.0 g/cm$^3$ or higher and 7.0 g/cm$^3$ or lower, more preferably 2.0 g/cm$^3$ or higher and 6.0 g/cm$^3$ or lower. This allows the fluorescent substance to be uniformly dispersed in the low-melting glass which is the sealing material, and it is therefore possible to enhance efficiency of utilization of excitation light.

Moreover, since the fluorescent substance is uniformly dispersed in the low-melting glass, a local deterioration of the light-emitting section 5 is less likely to occur, and it is therefore possible to provide the laser downlight 200a that has high and long-term reliability.

<Modification Example of how to Install Laser Downlight 200a>

Figure 18:
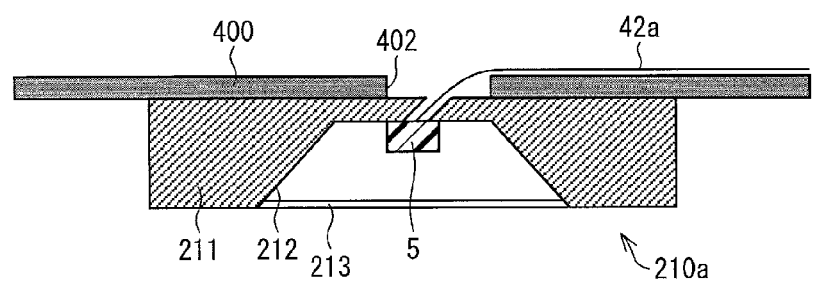
FIG. 18 is a cross-sectional view illustrating a modification example of how the laser downlight illustrated in FIG. 17 is installed.

FIG. 18 is a cross-sectional view illustrating a modification example of how the laser downlight 200a is installed. As illustrated in FIG. 18, the modification example of the installation method of the laser downlight 200a may include (i) opening a small hole 402 in the ceiling panel 400 for allowing the optical fiber 42a to pass through and (ii) attaching a laser downlight body (the light-emitting unit 210a) to the ceiling panel 400 with the use of a highly-adhesive tape or the like, by taking advantage of features of the light-emitting unit 210a, i.e., by taking advantage of reduced thickness and light weight of the light-emitting unit 210a. In this case, it is possible to obtain advantage that restrictions on the installation of the laser downlight 200a becomes less significant and installation cost can be drastically reduced.

Other Modification Example

The present invention is not limited to the embodiments, but can be altered by a skilled person in the art within the scope of the claims. An embodiment derived from a proper combination of technical means disclosed in respective different embodiments is also encompassed in the technical scope of the present invention.

The excitation light source can be configured by a light source other than a laser diode. Note, however, that it is preferable to employ a laser diode in view of reduction in size of the excitation light source.

[Main Points]

The wavelength converting member of the present invention includes a YAG:Ce fluorescent substance which is sealed by a sealing material, the YAG:Ce fluorescent substance having an average particle size of 1·m or larger and 50·m or smaller, the sealing material at least partially being made of an amorphous material, and a density of the sealing material being 2.0 g/cm$^3$ or higher and 7.0 g/cm$^3$ or lower.

The method of the present invention for producing a wavelength converting member is a method for producing a wavelength converting member containing a YAG:Ce fluorescent substance, and the method includes the steps of: mixing the YAG:Ce fluorescent substance, which has an average particle size of 1·m or larger and 50·m or smaller, with a sealing material which (i) is at least partially made of an amorphous material and (ii) has a density of 2.0 g/cm$^3$ or higher and 7.0 g/cm$^3$ or lower; and sintering a mixture of the YAG:Ce fluorescent substance and the sealing material, which mixture has been prepared in the mixing step.

According to the configuration, when the wavelength converting member containing the YAG:Ce fluorescent substance is irradiated with excitation light, the excitation light is converted into yellow fluorescence.

In a case where a fluorescent substance is dispersed in a sealing material, it is preferable to (i) employ a sealing material that is at least partially made of an amorphous material and (ii) disperse the fluorescent substance uniformly in the sealing material. This is because, in a case where dispersion of the fluorescent substance is biased, it is likely that the wavelength converting member is deteriorated due to heat generated in a part in which the fluorescent substance densely exists.

The inventors of the present invention have diligently studied and found it important to appropriately determine the average particle size and the density in order to uniformly disperse the YAG:Ce fluorescent substance in the sealing material.

Specifically, it is possible to uniformly disperse the fluorescent substance in the sealing material by (i) using the YAG:Ce fluorescent substance having the average particle size of 1·m or larger and 50·m or smaller and (ii) setting the density of the sealing material, which contains the amorphous material, to 2.0 g/cm$^3$ or higher and 7.0 g/cm$^3$ or lower, more preferably 2.0 g/cm$^3$ or higher and 6.0 g/cm$^3$ or lower.

By thus setting the average particle size and the density of the sealing material and the fluorescent substance, it is possible to uniformly disperse the fluorescent substance in the sealing material. Consequently, it is possible to suppress a deterioration of the wavelength converting member and to extend the life of the wavelength converting member.

It is preferable that the sealing material is low-melting glass.

According to the configuration, it is possible to disperse the fluorescent substance in the sealing material at a low temperature, and it is therefore possible to easily produce the wavelength converting member.

The technical scope of the present invention encompasses (i) a light-emitting device including the wavelength converting member and an excitation light source that emits excitation light to the wavelength converting member, (ii) an illuminating device including the light-emitting device, and (iii) a vehicle headlight including the light-emitting device.

By applying the wavelength converting member of the present invention to the light-emitting device, the illuminating device, or the vehicle headlight, it is possible to extend the life of these devices and to enhance reliability of these devices.

It is preferable that the excitation light source includes a light emitting diode.

By employing the light emitting diode (LED) as the excitation light source, it is possible to reduce a size of the light-emitting device itself that includes the excitation light source and the light-emitting section, because the LED is small in size. This allows the light-emitting device to be applied to wider variety of products. It is further possible to improve flexibility in design of a product provided with the light-emitting device. Furthermore, it is possible to reduce cost of the light-emitting device because the LED chip is low in cost.

It is preferable that the excitation light source emits laser light.

By employing the light source that emits laser light, it is possible to obtain excitation light with a notably high power density. This allows the wavelength converting member to emit illuminating light with high luminance and high luminous flux.

It is preferable that the excitation light source includes a laser diode.

By employing the laser diode as the excitation light source, it is possible to reduce a size of the light-emitting device itself that includes the excitation light source and the wavelength converting member, because the laser diode is small in size. This allows the light-emitting device to be applied to wider variety of products. It is further possible to improve flexibility in design of a product provided with the light-emitting device.

In the method for producing the wavelength converting member, it is preferable that an average particle size of powder particles of the sealing material is 1·m or larger and 500·m or smaller. According to the configuration, it is possible to suppress bubbles remaining in the wavelength converting member, which bubbles have been generated in producing the wavelength converting member. Accordingly, it is possible to prevent the wavelength converting member from being cracked due to the bubbles in the wavelength converting member while the light-emitting device is being used.

A light-emitting device of the present invention includes: an excitation light source for emitting excitation light; a wavelength converting member containing a fluorescent substance that emits light in response to the excitation light emitted by the excitation light source; and a thermally conductive member that is thermally connected to the wavelength converting member so as to receive heat from the wavelength converting member, a difference between a thermal expansion coefficient of the wavelength converting member containing the fluorescent substance and a thermal expansion coefficient of the thermally conductive member being $0.1 \times 10^{-6}$/° C. or lower.

When the wavelength converting member emits light in response to excitation light, a part of the excitation light becomes heat and the wavelength converting member is accordingly heated. According to the configuration of the present invention, however, the thermally conductive member is thermally connected to the wavelength converting member, and the thermally conductive member receives the heat of the wavelength converting member so as to release the heat of the wavelength converting member.

Repeatedly turning on and off the wavelength converting member by means of irradiation of excitation light decreases the connecting force between the wavelength converting member and the thermally conductive member, and may even disconnect the wavelength converting member and the thermally conductive member from each other. Specifically, since the wavelength converting member has a thermal expansion coefficient different from that of the thermally conductive member, heat generated by the wavelength converting member disconnects the wavelength converting member and the thermally conductive member from each other due to the above difference in thermal expansion coefficient.

The inventors of the present invention have diligently studied and found it possible to effectively suppress a decrease in connecting force between the wavelength converting member and the thermally conductive member which decrease is caused due to the difference in thermal expansion coefficient. Specifically, the inventors of the present invention found it possible to suppress the decrease in connecting force by approximating the thermal expansion coefficients of respective of the wavelength converting member and the thermally conductive member so that the difference between (i) the thermal expansion coefficient of the wavelength converting member containing the fluorescent substance and (ii) the thermal expansion coefficient of the thermally conductive member becomes $0.1 \times 10^{-6}/°$ C. or lower.

Therefore, according to the configuration, it is possible to provide the light-emitting device which can (i) prevent a deterioration of the wavelength converting member due to generated heat, (ii) prevent a decrease in connecting force between the wavelength converting member and the thermally conductive member, and (iii) emit light with high efficiency for a long time period.

It is preferable that the thermally conductive member (i) is made of a transparent material and (ii) is connected to an excitation light illuminated surface of the wavelength converting member, the excitation light illuminated surface being a surface which is to be irradiated with the excitation light.

According to the configuration, the thermally conductive member (i) is made of a transparent material and (ii) is connected to an excitation light illuminated surface of the wavelength converting member, the excitation light illuminated surface being a surface which is to be irradiated with the excitation light. With the configuration, the wavelength converting member is irradiated with the excitation light via the light transmitting thermally conductive member. This allows the thermally conductive member to receive heat of the wavelength converting member from an excitation light illuminated surface side of the wavelength converting member, on which side the heat is more likely to be generated. It is therefore possible to efficiently release the heat of the wavelength converting member.

Therefore, according to the configuration, it is possible to improve efficiency of releasing heat generated by the wavelength converting member.

It is preferable that the excitation light source is thermally isolated from the wavelength converting member.

According to the configuration, the excitation light source is thermally isolated from the wavelength converting member. This makes it possible to prevent heat, which has been generated in the excitation light source when excitation light is emitted, from being transferred to the wavelength converting member.

According to the configuration, it is possible to suppress a decrease in luminous efficiency which is caused by a deterioration of the fluorescent substance due to heat generated in the excitation light source.

It is preferable that the wavelength converting member further includes a sealing material, and the fluorescent substance is dispersed in the sealing material; and the sealing material has a thermal expansion coefficient that is greater than that of the thermally conductive member.

According to the configuration, the wavelength converting member contains the sealing material in which the fluorescent substance is dispersed. With the configuration, it is possible to easily adjust the thermal expansion coefficient of the wavelength converting member by changing the thermal expansion coefficient of the sealing material.

It is generally known that a fluorescent substance has a thermal expansion coefficient that is lower than that of a thermally conductive member. In view of this, in a case where the fluorescent substance is sealed by a sealing agent that has a thermal expansion coefficient greater than that of the thermally conductive member, it is possible to approximate the thermal expansion coefficient of the wavelength converting member, in which the fluorescent substance is dispersed, to the thermal expansion coefficient of the thermally conductive member.

According to the configuration, it is therefore possible to adjust the difference in thermal expansion coefficient between the wavelength converting member and the thermally conductive member to $0.1 \times 10^{-6}/°$ C. or lower.

It is preferable that the sealing material is inorganic glass.

According to the configuration, the sealing material is the inorganic glass. This makes it possible to configure the wavelength converting member that is excellent in heat resistance and transparency.

It is preferable that the light-emitting device further includes: a connecting layer via which the wavelength converting member is thermally connected to the thermally conductive member, the connecting layer being flexible.

According to the configuration, the light-emitting device further includes the connecting layer via which the wavelength converting member is thermally connected to the thermally conductive member. With the use of the connecting layer, it is possible to easily (i) connect the wavelength converting member to the thermally conductive member and (ii) fix the wavelength converting member and the thermally conductive member.

Moreover, according to the configuration, the connecting layer is flexible, and the connecting layer can therefore absorb a difference in thermal expansion coefficient between the wavelength converting member and the thermally conductive member by changing its shape. This makes it possible to effectively prevent the wavelength converting member from being detached from the thermally conductive member.

It is preferable that the excitation light is laser light.

According to the configuration, the excitation light is laser light. This allows the fluorescent substance to be effectively excited. It is therefore possible to provide the light-emitting device with a high luminance.

In a case where the wavelength converting member is irradiated with the laser light having a high energy density, it becomes more likely that more heat is locally generated from the wavelength converting member and therefore (i) the wavelength converting member is deteriorated and (ii) the connecting force between the wavelength converting member and the thermally conductive member is decreased. However, even in such a case, it is possible to prevent the decrease in connecting force between the wavelength converting member and the thermally conductive member by setting the difference in thermal expansion coefficient between the thermal expansion coefficient and the thermally conductive member to $0.1 \times 10^{-6}/°$ C. or lower.

An illuminating device of the present invention includes the above described light-emitting device.

According to the configuration, the illuminating device includes the light-emitting device. This makes it possible to prevent (i) a deterioration in wavelength converting member caused by generated heat and (ii) a decrease in connecting force between the wavelength converting member and the thermally conductive member. It is therefore possible to provide the illuminating device which can emit light with high efficiency for a long time period.

A vehicle headlight of the present invention includes the above described light-emitting device.

According to the configuration, the vehicle headlight includes the light-emitting device. This makes it possible to prevent (i) a deterioration in wavelength converting member caused by generated heat and (ii) a decrease in connecting force between the wavelength converting member and the thermally conductive member. It is therefore possible to provide the vehicle headlight which can emit light with high efficiency for a long time period.

[Remarks]

Note that the light-emitting device of the present invention can be expressed as follows.

That is, the wavelength converting member of the present invention is a wavelength converting member that emits light in response to excitation light, the wavelength converting member being made of at least two raw materials which are fluorescent substance powder and glass powder, the fluorescent substance being made of a YAG:Ce fluorescent substance and having an average particle size of 1·m to 50·m, and the glass powder having an average particle size of 1·m or larger and 500·m or smaller.

According to the wavelength converting member of the present invention, a mixing ratio of the fluorescent substance powder and the glass powder may fall within a range between 30:70 and 50:50 in terms of mass ratio.

According to the wavelength converting member of the present invention, the excitation light may be emitted by a laser diode.

The light-emitting device of the present invention relates to a laser illuminating light source made up of (i) a light-emitting section containing a fluorescent substance, (ii) a transparent heat radiating member for releasing heat generated by the light-emitting section, and (iii) an excitation light source for emitting laser light, the light-emitting section and the transparent heat radiating member being thermally connected to each other, a difference in thermal expansion coefficient between the light-emitting section and the transparent heat radiating member being $0.1 \times 10^{-6}/°$ C. or lower, and the light-emitting section being irradiated, via the transparent heat radiating member, with excitation light emitted by the excitation light source, and thereby the light-emitting section emitting illuminating light.

The light-emitting device of the present invention relates to a laser illuminating light source made up of (i) a light-emitting section containing a fluorescent substance, (ii) a transparent heat radiating member for releasing heat generated by the light-emitting section, and (iii) an excitation light source for emitting laser light, the light-emitting section containing an inorganic glass material in which the fluorescent substance is dispersed, the light-emitting section and the transparent heat radiating member being thermally connected to each other, a thermal expansion coefficient of the inorganic glass material being greater than that of the transparent heat radiating member, and the light-emitting section being irradiated, via the transparent heat radiating member, with excitation light emitted by the excitation light source, and thereby the light-emitting section emitting illuminating light.

INDUSTRIAL APPLICABILITY

The present invention is applicable to a headlamp or the like which (i) achieves a high luminance and a long life and (ii) is provided in a device such as a light-emitting device, an illuminating device, or a vehicle.

REFERENCE SIGNS LIST

1: Headlamp (vehicle headlight)
2: Laser diode (excitation light source)
5: Light-emitting section (wavelength converting member)
6: Reflecting mirror
9: Transparent plate
13: Thermally conductive member
15: Connecting layer
16: Dispersing material (thermally conductive particles)
23: Laser diode (excitation light source)
30: Headlamp (vehicle headlight)
52: Light-emitting section (wavelength converting member)
52a: Laser light illuminated surface (excitation light illuminated surface)
53: Light-emitting section (wavelength converting member)
53a: Laser light illuminated surface (excitation light illuminated surface)
57: Reflection film
81: Reflecting mirror
85: Transparent plate
90: Headlamp (vehicle headlight)
93: Transparent plate
200: Laser downlight (illuminating device)
L0: Excitation light (laser light)

The invention claimed is:

1. A light-emitting device comprising:
an excitation light source for emitting excitation light;
a wavelength converting member containing a fluorescent substance that emits light in response to the excitation light emitted by the excitation light source, the wavelength converting member having an incident surface on which the excitation light is incident; and
a thermally conductive member that is thermally connected to the wavelength converting member so as to receive heat from the wavelength converting member,
a difference between a thermal expansion coefficient of the wavelength converting member containing the fluorescent substance and a thermal expansion coefficient of the thermally conductive member being $0.1 \times 10^{-6}/°$ C. or lower, and
the thermally conductive member being transparent and of a plate-like shape, the plate like shape being with or without a bend and with or without a curved portion, the thermally conductive member being between the excitation light source and the incident surface of the wavelength converting member.

2. The light-emitting device as set forth in claim 1, wherein:
the excitation light source is thermally isolated from the wavelength converting member.

3. The light-emitting device as set forth in claim 1, wherein:
the wavelength converting member further includes a sealing material;

the fluorescent substance is dispersed in the sealing material; and the sealing material has a thermal expansion coefficient that is greater than that of the thermally conductive member.

4. The light-emitting device as set forth in claim 3, wherein:

the sealing material is inorganic glass.

5. The light-emitting device as set forth in claim 1, wherein:

the excitation light is laser light.

6. An illuminating device comprising a light-emitting device recited in claim 1.

7. A vehicle headlight comprising a light-emitting device recited in claim 1.

8. A light-emitting device comprising:

an excitation light source for emitting excitation light;

a wavelength converting member containing a fluorescent substance that emits light in response to the excitation light emitted by the excitation light source, the wavelength converting member having an incident surface on which the excitation light is incident;

a thermally conductive member that is thermally connected to the wavelength converting member so as to receive heat from the wavelength converting member; and a connecting layer disposed between the wavelength converting member and the thermally conductive member so that the wavelength converting member is thermally connected to the thermally conductive member through the connecting layer, the connecting layer being flexible, a difference between a thermal expansion coefficient of the wavelength converting member containing the fluorescent substance and a thermal expansion coefficient of the thermally conductive member being $0.1 \times 10^{-6}/°$C. or lower.

9. The light-emitting device as set forth in claim 8, wherein:

the excitation light source is thermally isolated from the wavelength converting member.

10. The light-emitting device as set forth in claim 8, wherein:

the wavelength converting member further includes a sealing material;

the fluorescent substance is dispersed in the sealing material; and the sealing material has a thermal expansion coefficient that is greater than that of the thermally conductive member.

11. The light-emitting device as set forth in claim 10, wherein:

the sealing material is inorganic glass.

12. The light-emitting device as set forth in claim 8, wherein:

the excitation light is laser light.

13. An illuminating device comprising a light-emitting device recited in claim 8.

14. A vehicle headlight comprising a light-emitting device recited in claim 8.

15. The light-emitting device as set forth in claim 8, wherein the thermally conductive member has a thermal conductivity of 20 W/mK or more.

16. The light-emitting device as set forth in claim 15, wherein the thermally conductive member is made of sapphire, magnesia, gallium nitride, aluminum nitride, or spinel.

17. The light-emitting device as set forth in claim 8, wherein the connecting layer is disposed between the incident surface of the wavelength converting member and the thermally conductive member.

18. The light-emitting device as set forth in claim 8, wherein the connecting layer comprises an inorganic material.

* * * * *